US009137292B2

(12) United States Patent
Christopher et al.

(10) Patent No.: US 9,137,292 B2
(45) Date of Patent: Sep. 15, 2015

(54) REMOTE MANAGEMENT OF DLNA SYSTEM

(71) Applicant: AMERICAN MEGATRENDS, INC., Norcross, GA (US)

(72) Inventors: Samvinesh Christopher, Suwanee, GA (US); Varadachari Sudan Ayanam, Suwanee, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 372 days.

(21) Appl. No.: 13/873,743

(22) Filed: Apr. 30, 2013

(65) Prior Publication Data
US 2014/0324944 A1 Oct. 30, 2014

(51) Int. Cl.
*G06F 15/16* (2006.01)
*H04L 29/08* (2006.01)

(52) U.S. Cl.
CPC .................. *H04L 67/025* (2013.01)

(58) Field of Classification Search
CPC ..... H04L 67/025; H04L 12/28; H04N 21/454
USPC ........... 709/203, 219, 250; 715/716; 370/310, 370/312
See application file for complete search history.

(56) References Cited

U.S. PATENT DOCUMENTS

| 2010/0329173 | A1* | 12/2010 | Murphy et al. ............... 370/313 |
| 2011/0307376 | A1* | 12/2011 | Woxblom ....................... 705/39 |
| 2013/0055303 | A1* | 2/2013 | Kannan et al. .................. 725/25 |
| 2013/0318440 | A1* | 11/2013 | Wu et al. ....................... 715/716 |
| 2014/0108844 | A1* | 4/2014 | Lee et al. ....................... 713/323 |
| 2014/0365856 | A1* | 12/2014 | Costa-Requena et al. .... 715/205 |

* cited by examiner

*Primary Examiner* — Frantz Jean
(74) *Attorney, Agent, or Firm* — Locke Lord LLP; Tim Tingkang Xia, Esq.

(57) ABSTRACT

Certain aspects of the present disclosure are directed to an IPMI Compatible Digital Media Controller (DMC). The IPMI Compatible DMC includes: a processor, a network interface controller, and a memory. The memory contains a firmware, and when the it is executed at the processor, the firmware is configured: (a) to be in communication with a number of digital media devices in a local DLNA network, (b) to receive an IPMI message from a remote management device through the network interface controller; and (c) to execute, in response to the IPMI message, an DLNA operation of the DMR or DMS. The digital media devices include at least one digital media renderer (DMR) and at least one digital media server (DMS).

20 Claims, 6 Drawing Sheets

REMOTE MANAGEMENT OF DLNA SYSTEM

FIELD

The present disclosure generally relates to signage display, and more particularly to a method and an apparatus for remote management of contents for multiple digital signage system using Digital Living Network Alliance (DLNA) network and display devices.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Typically, devices in a local network and complying with Digital Living Network Alliance (DLNA) standards can be controlled locally by a Digital Media Controller (DMC) within the network. On the other hand, Intelligent Platform Management Interface ("IPMI") is an industry standard for system monitoring and event recovery. The IPMI specification provides a common message-based interface for remotely or locally accessing all of the manageable features in a compatible computer. IPMI includes a rich set of predefined commands for reading temperature, voltage, fan speed, chassis intrusion, and other parameters. System event logs, hardware watchdogs, and power control can also be accessed through IPMI.

Therefore, heretofore unaddressed needs still exist in the art to address the aforementioned deficiencies and inadequacies.

SUMMARY

Certain aspects of the present disclosure are directed to an IPMI Compatible Digital Media Controller (DMC). The IPMI Compatible DMC includes: a processor, a network interface controller, and a memory. The memory contains a firmware, and when the it is executed at the processor, the firmware is configured: (a) to be in communication with a number of digital media devices in a local DLNA network, (b) to receive an IPMI message from a remote management device through the network interface controller; and (c) to execute, in response to the IPMI message, an DLNA operation of the DMR or DMS. The digital media devices include at least one digital media renderer (DMR) and at least one digital media server (DMS).

In certain embodiments, the firmware further includes: a DMC module, a network interface, an IPMI message module, a DLNA interface, a digital media device database, a digital media content database, and a sensor data record (SDR). The DMC module is configured to manage or perform management functions on one or more of the digital media devices according to a DLNA protocol. The network interface is configured to receive and transmit an IPMI message embedded in an IP packet to and from the remote management device. The IPMI message module is configured to process the incoming IPMI message from, and outgoing IPMI message to the remote management device. The DLNA interface is configured to receive and transmit the DLNA communication through the DLNA communication link. The digital media device database is used to store property information of the digital media devices. The digital media content database is used to store inventory and property information of digital media contents of the at least one DMS available to be rendered with the at least one DMR. The SDR is used to store inventory information of the digital media devices.

In certain embodiments, the DLNA interface is in communication with the digital media devices in accordance with the DLNA communication protocol. The DMC module is configured to determine the DLNA operation based on an IPMI command and a UUID of a target digital media device extracted from the IPMI message, and instruct the DLNA interface to invoke a corresponding DLNA action at the target digital media device.

In certain embodiments, the remote management device includes a user interface, and the user interfaces is configured to present management operation options to a user, and receive management requests from the user. Each of the management requests includes data for constructing an IPMI message in accordance with the IPMI communication protocol. The IPMI message contains at least an IPMI OEM command, a digital media device number of a selected digital media device, and a related command value.

In certain embodiments, the firmware is configured to: (a) receive a DLNA response message encapsulated in at least one network packet from the digital media devices through the DLNA interface and a DLNA communication link between the IPMI Compatible DMC and the local DLNA network, (b) generate an IPMI response message, and (c) send the IPMI response message back to the remote management device. The firmware is also configured to: (a) associate each of the DMR with a respective universal unique identification (UUID) in accordance with the DLNA protocol, (b) maintain a record of the association of the UUID and the DMR, and (c) determine the target digital media device by examining the record with the UUID. Furthermore, the firmware is configured to: (a) associate each of the DMS with a respective UUID in accordance with the DLNA protocol, (b) maintain a record of the association of the UUID and the DMS, and (c) maintain a record of the digital media contents in the DMS by the UUID.

In certain embodiment, the firmware is configured to: (a) provide communication access for communicating with the digital media devices, (b) interpret IPMI messages, and (c) perform the DLNA operation directed to the digital media devices. The DLNA operation is requested by an IPMI OEM command. The firmware is also configured to dynamically discover inventory and property information of the digital media devices. The firmware also has an IPMI message interface in communication with the network interface controller in accordance with IPMI protocol.

Certain aspect of the present disclosure are directed to an IPMI Compatible Digital Media Controller (DMC) implemented method for managing a DLNA system having a DLNA interface and digital media devices. The IPMI Compatible DMC implemented method includes: (a) receiving a DLNA system management request at a user interface of a remote management device, (b) constructing an IPMI message containing the DLNA management request to an IPMI Compatible DMC by an IPMI application program, (c) extracting the DLNA management request embedded in the IPMI message at an IPMI message module, (d) forwarding the DLNA management request to a DMC module, (e) translating the DLNA management request into DLNA actions at the DMC module, (f) sending the DLNA actions, by the DLNA interface, to the digital media devices, and (g) executing the DLNA actions at the digital media devices. The digital media devices have at least one digital media renderer (DMR) and at least one digital media server (DMS).

In certain embodiments, the IPMI Compatible DMC implemented method also includes: (a) receiving response information from the digital media devices at the DLNA interface, (b) sending the response information to the DMC module and the IPMI message module of the IPMI Compatible DMC, (c) constructing an IPMI response message at the IPMI message module, (d) sending the IPMI response message to the IPMI application program, and (e) displaying the response information in the IPMI response message at the user interface of the remote management device. The method also includes: (a) providing communication access for communication between the user interface to the IPMI message module according to the IPMI protocol, and (b) providing communication access for communication between the DMC module and the digital media devices according to the DLNA protocol.

In certain embodiments, the method includes: (a) dynamically discovering the digital media devices, (b) storing the device information of the discovered digital media devices in a digital media device database and a sensor data record (SDR) on the IPMI Compatible DMC, (c) receiving browsing digital media content request from the user interface, (d) retrieving digital media content information on the at least digital media server by the DLNA interface, and (e) storing the digital media content information retrieved in a digital media content database on the IPMI Compatible DMC.

Certain aspects of the present disclosure are directed to a non-transitory computer storage medium. The non-transitory computer storage medium stores computer-executable instructions and when these instructions are executed by a processor of an IPMI Compatible Digital Media Controller (DMC), these instructions cause the processor to (a) receive a DLNA system management request at a user interface of a remote management device, (b) construct an IPMI message containing the DLNA management request to an IPMI Compatible DMC by an IPMI application program, (c) extract the DLNA management request embedded in the IPMI message at an IPMI message module, (d) forward the DLNA management request to a DMC module, (e) translate the DLNA management request into DLNA actions at the DMC module, (f) send the DLNA actions, by the DLNA interface, to the digital media devices, and (g) execute the DLNA actions at the digital media devices.

In certain embodiments, the computer-executable instructions cause the processor to: (a) receive response information from the digital media devices at the DLNA interface, (b) send the response information to the DMC module and the IPMI message module of the IPMI Compatible DMC, (c) construct an IPMI response message at the IPMI message module, (d) send the IPMI response message to the IPMI application program, and (e) display the response information in the IPMI response message at the user interface of the remote management device. The computer-executable instructions also cause the processor to: (a) provide communication access for communication between the user interface to the IPMI message module according to the IPMI protocol, and (b) provide communication access for communication between the DMC module and the digital media devices according to the DLNA protocol.

In certain embodiments, the computer-executable instructions cause the processor to: (a) dynamically discover the digital media devices, (b) store the device information of the discovered digital media devices in a digital media device database and a sensor data record (SDR) on the IPMI Compatible DMC, (c) receive browsing digital media content request from the user interface, (d) retrieve digital media content information on the at least digital media server by the DLNA interface, and (e) store the digital media content information retrieved in a digital media content database on the IPMI Compatible DMC.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
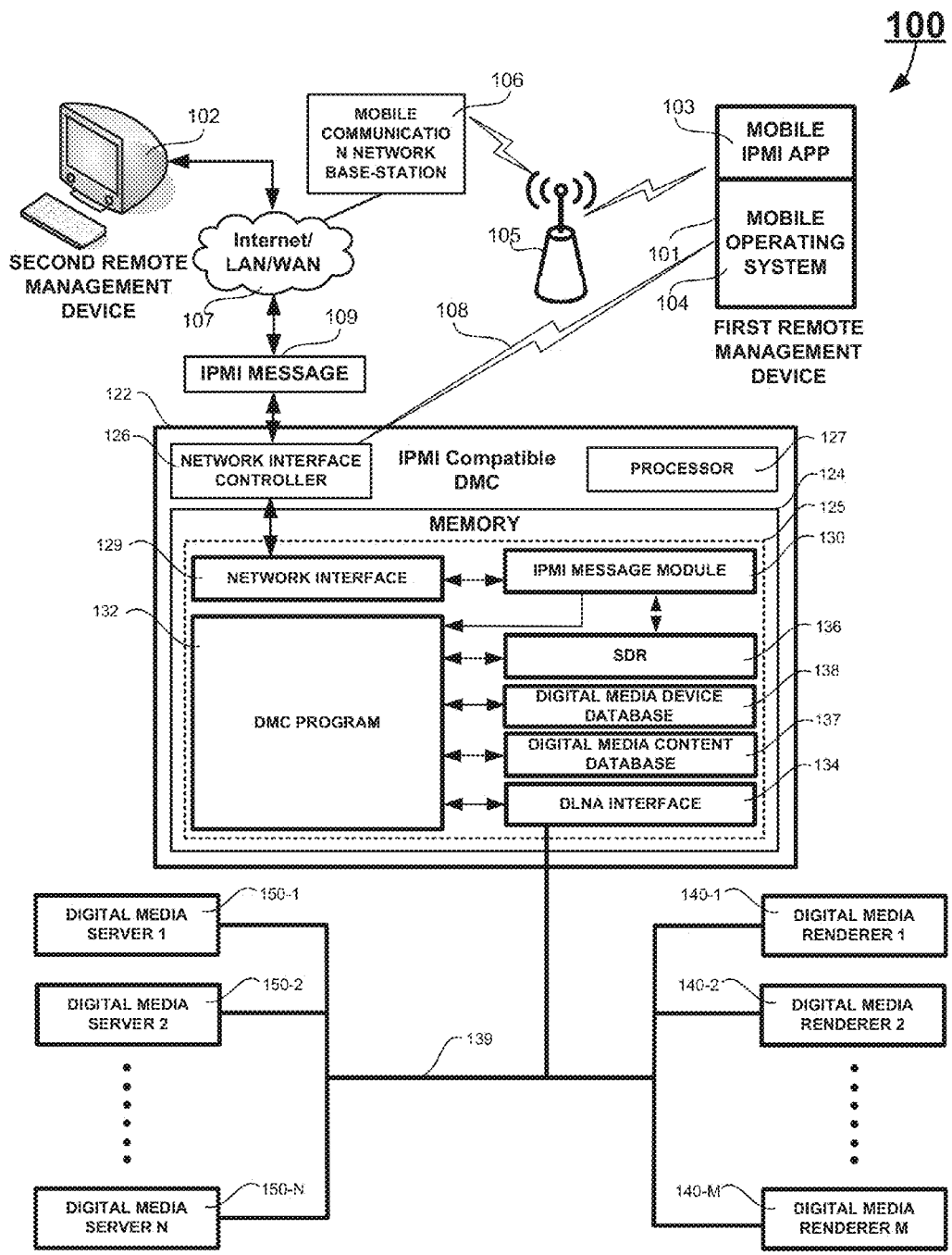
FIG. 1 schematically shows a remote management system for a DLNA network according to one embodiment of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Current advance in large size LED, LCD, light matrix made it possible to provide digital media devices to provide very large size signage, billboard, and display device various display in texts, still messages, animations, videos, and real time information. The digital media devices allow business to manage information display that is crucial to the business operation in real time. The type of remote management is quite similar to the remote monitoring and manipulation of computer platforms using IPMI technology. Using existing IPMI technology to remotely manage digital signage displays is a natural extension of the mature IPMI technology to the management of digital signage displays. The only difference here is that the IPMI is used in digital media devices management with a general purpose IPMI system instead of proprietary and display device vendor specific management system. A remote management system using IPMI technology can be used to bridge the gap between the IPMI and digital signage displays.

General architecture of a digital media management system is described below in conjunction with FIGS. 1 and 2. A detailed digital media management system 100 is shown in detail in FIG. 1, and a simplified digital media management system 200 is shown in FIG. 2, according to certain embodiments of the present disclosure. The system 100 includes a DLNA network 139 and one or more remote management devices. The DLNA network includes an IPMI-Compatible Digital Media Controller (DMC) 122, Digital Media Renderers (DMRs) 140-I, I=1, 2, . . . , N, and Digital Media Servers (DMSs) 150-J, J=1, 2, . . . , M. The DLNA network 139 can be a wired or wireless network. As shown in FIG. 2, the digital media management system can be conceptually considered as having two major domains: (a) an IPMI domain 202 and (b) a DLNA domain 204. In certain embodiments, an IP protocol and an IPMI protocol are used in the IPMI domain 202. A UPnP protocol is used in the DLNA domain 204.

Intelligent Platform Management Interface ("IPMI") is an industry standard for system monitoring and event recovery. The IPMI specification provides a common message-based interface for accessing all of the manageable features in a compatible computer. IPMI includes a rich set of predefined commands for reading temperature, voltage, fan speed, chassis intrusion, and other parameters. System event logs, hardware watchdogs, and power control can also be accessed through IPMI. In this manner, IPMI defines protocols for accessing the various parameters collected by a BMC through an operating system or through an external connection, such as through a network or serial connection. Additional details regarding IPMI can be found in the IPMI Specification (Version 2.0), which is publicly available from INTEL CORPORATION, and which is incorporated herein by reference.

In certain embodiments, the digital media management system includes: (a) one or more remote management devices 101 and 102 and (b) an IPMI Compatible Digital Media Controller (DMC) 122.

A first remote management device 101 is in communication with the IPMI Compatible DMC 122 through a communication network. In certain embodiments, the communication network can be a mobile communication network 105 with a mobile communication network base-station 106, a WAN/LAN/Internet network 107. In certain embodiments, the remote management device 101 can communicates with the IPMI compatible DMC through Bluetooth or ZigBee connection. The mobile communication network 105 includes GSM, GPRS, HSPA, CDMA, WCDMA, WiMAX, LTE, satellite communication and many other networks.

In certain embodiments, the first remote management device 101 may be a mobile communication device such as a smart phone or a tablet computer with network connectivity. These smart phone and tablet computer can include a mobile operating system 104 such as iOS, Windows, or Android operating system. The first remote management device also includes an IPMI-based content digital media management application program 103 for remote management of the DMRs 140, the DMSs 150 and the associated digital media stored in the DMSs 150.

In certain embodiments, the system 100 may also include a second remote management device 102 in communication with the compatible controller. The second remote management device 102 can be a regular computer or a special purpose computer also with network connectivity.

In one embodiment, the first remote management device 101 includes an Mobile IPMI management application (APP) 103 running on a mobile operating system 104 for managing digital media servers (DMSs) and digital media renderers (DMRs) connected to the DLNA network. The first remote management device 101 is in communication with a wireless base station 105, which is connected with a mobile communication network 106. The telecommunication network 106, through another computer network 107 such as LAN/WAN/Internet/WI-FI, is in communication with the IPMI Compatible DMC 122. In certain embodiments, the second remote management device 102 is directly connected with the computer network 107. In certain embodiments, the first remote management device 102 is connected with the IPMI Compatible DMC 122 through Bluetooth or Zigbee. Thus, the Mobile IPMI APP 103 on the first remote management device 101 can construct an IPMI message and send the message to the IPMI Compatible DMC 122 through the telecommunication network 106 and the computer network 108 in order to perform a management action or operation on the IPMI Compatible DMC 122.

All IPMI messages share the same fields in the message 'payload'—regardless of the interface (transport) that they're transferred over. The same core of IPMI messages is available over every IPMI-specified interface, they are just 'wrapped' differently according to the needs of the particular transport. This enables a piece of management software that works on one interface to be converted to use a different interface mainly by changing the underlying 'driver' for the particular transport. IPMI commands are grouped into functional command sets, using a field called the Network Function Code. There are command sets for sensor and event related commands, chassis commands, etc. This functional grouping makes it easier to organize and manage the assignment and allocation of command values. Since the application here is not related to the traditional computer system management, some of the IPMI commands are not traditional IPMI. The remote management of DMSs, and DMRs uses extended OEM command set created just for the remote management of DMSs, and DMRs.

The operation of the remote management includes commands or functions to control and manage the DMSs and DMRs, and each of the DMSs and DMRs is represented by unique device Id such as UUID, which will be described in later sections.

In certain embodiments, the remote management device 101 has an IPMI application program 103 and a user interface module. The user interface module can generates various user interfaces (UIs) and display the UIs on the display screen of the remote management device 101. The UIs allows an operator to enter various user inputs for operating the IPMI Compatible DMC 122. In certain embodiments, the user interface module can generate and display a login screen. The login screen for example has a username field, a password field, and field for entering a network address of an IPMI compatible DMC 122. The UI module receives username and password entered by the operator. Upon the operator presses an "enter" button on the login screen, the user interface module construct a user-authentication input and calls an input-executing function of the IPMI application program 103 to pass the input to the IPMI program 103. As will be described in detail below, the input-executing function of the IPMI application program 103 processes the user-authentication input and in response returns an execution result to the UI module. In response to a user-authentication input, the result can be an "access granted" message when the user is authenticated by the IPMI Compatible DMC 122, or an "access denied" message when user is not authenticated. Accordingly, the UI module can display those messages on the display screen of the remote management device.

In certain embodiments, after the operator login to the IPMI Compatible DMC, the operator may want the user interface to list all digital media devices including all digital media servers (DMSs) and digital media renderers (DMRs) connected to a DLNA network. The UI module can display a display-device option on the screen of the remote device. When the operator selects the display-device option, the UI module construct a display-device input and calls again the input-execution function of the IPMI application program 103 to pass the input to the mobile IPMI application program. In response to the display-device input, the input-execution function of the IPMI application program 103 returns a list of digital media devices. The list of digital media devices may be empty if the DLNA network does not have any digital media devices available in the network. The UI module can generate a display-device interface showing the digital media devices. Each device is associated with a universally unique identifier (UUID).

In certain embodiments, once the operator obtains the list of digital media devices, the operator may want the user interface to list all digital media contents available in all digital media servers (DMSs) connected to the DLNA network. The operator may select an option on the user interface module to displays all digital media contents. The user interface module can construct a list-all-content input and calls again the input-execution function of the IPMI application program 103 to pass the input to the IPMI application program 103 to request a list of all digital media contents. The first application program processes the list-all-content input and returns a list of digital media content. The list of digital media content may be empty if there is not any digital media content available in the network. The user interface module can display the list of digital media content on a content user interface screen. Each item of content is associated with a content ID.

In certain embodiments, once the operator obtains the list of digital media contents, the operator may want use the digital media renderers available to render the digital media contents available in the DLNA network. The operator may select an option on the user interface to select a digital media content on a DMS to display on a DMR. The user interface module then sends an input to the IPMI application program 103 to request the selected DMR to display the selected content on the DMS. The input includes the content ID of the selected content and the uuid of the selected DMR. On the digital media rendering screen of the user interface, the response will be displayed. The digital media rendering screen may also include other rendering options such as pause, stop, rewind, fast forward operations such that the operator can control the digital media rendering process. When an option is selected by the operator, the user interface module can call again the input-execution function of the IPMI application program 103 to pass a corresponding input to the IPMI application program 103.

In certain embodiments, in addition to rendering digital media contents on a DMR, the operator may want to make certain adjustments to the DMR such as making audio adjustment or video adjustments. The operator may select an option on the user interface to make audio adjustment or video adjustment. The audio adjustment includes setting the audio level higher or lower, setting the audio mute on or off, etc. The video adjustment includes setting the brightness, contrast, color, or setting the close caption on or off etc. The user interface module sends an input to the IPMI application program 103 to request the selected DMR to make appropriate adjustments. The IPMI application program 103 constructs an OEM IPMI message to the IPMI Compatible DMC 122 to request the specific DMR to make adjustment accordingly. The IPMI application program 103 receives a response back and the response indicating the rendering request is executed or an error message showing why the audio or video adjustment has failed. On the digital media rendering screen of the user interface, the response will be displayed.

In certain embodiments, the user interface module is able to present the operator various display options. When the user interface module receives the responses from the IPMI Compatible DMC 122, it can display: the list of DMSs available on the DLNA network, the list of DMRs available on the DLNA network, the list of digital media contents available on the DLNA network, the digital media rendering status, and the various DMR adjustment responses and status.

The IPMI application program 103 communicates with the IPMI Compatible DMC 122 in both directions. The IPMI application program 103 sends two types of commands to the IPMI Compatible DMC 122: (a) a standard IPMI commands, such as standard IPMI commands to add an entry to the sensor data record (SDR), to retrieve an entry from the SD, or delete an entry from the SDR, and (b) an OEM IPMI commands. IPMI OEM commands are the non-standard IPMI commands that the IPMI based remote multimedia content management system added to implement the control and management functions of the IPMI based remote multimedia content management system.

In general, the remote management device can send IPMI messages having predetermined IPMI OEM commands to the IPMI Compatible DMC. The IPMI OEM commands correspond to various media management functions that can be performed at the IPMI Compatible DMC. The IPMI messages also include parameters of the media management functions. In order to perform each media management functions, the IPMI Compatible DMC invokes one or more DLNA/UPnP functions based on the OEM commands and the parameters accordingly.

The IPMI messages typically include the following fields.
Network Function (NetFn): A field that identifies the functional class of the message. The values for the network function fields include: requests and responses of for many standard IPMI functions and certain reserved and OEM/Non-IPMI functions. Here, the OEM/Non-IPMI functions are used for the remote management of contents for multiple digital signage system.
Request/Response identifier: A field that unambiguously differentiates Request Messages from Response Messages. This identifier is reflected in the Network Function code such that 'Even' network function codes identify Request Messages, and 'Odd' network function codes identify Response Messages. For example, OEM/Non-IPMI Group request is represented by 2Fh and OEM/Non IPMI Group response is represented by 2Eh.
Requester's ID: Information that identifies the source of the Request. This information must be sufficient to allow the Response to be returned to the correct Requester.
Responder's ID: A field that identifies the Responder to the Request. In Request Messages this field is used to address the Request to the desired Responder, in Response Messages this field is used to assist the Requester in matching up a response with a given request.
Command: The messages specified in this document contain a one-byte command field. Commands are unique within a given Network Function. Command values can range from 00h through FDh. Code FEh is reserved for future extension of the specification, and code FFh is reserved for message interface level error reporting on potential future interfaces.
Data The Data field carries the additional parameters for a request or a response, if any.

Some of the typical and exemplary media management functions supported by the IPMI Compatible DMC are listed below:

| Media Management Function | IPMI OEM CMD | | |
| --- | --- | --- | --- |
| | NetFn | CMD | Parameters |
| Browse( ) | 2Fh | 11h | dms__uuid, dms__instanceID, dmc__instanceID |
| Search( ) | 2Fh | 12h | dms__uuid, dms__instanceID, dmc__instanceID |
| FreeFormQuery( ) | 2Fh | 13h | dms__uuid, dms__instanceID, dmc__instanceID |
| RenderingControl | | | |
| GetBrightness( ) | 2Fh | 21h | dmr__uuid, dmr__instanceID |
| SetBrightness( ) | 2Fh | 22h | dmr__uuid, dmr__instanceID |
| GetContrast( ) | 2Fh | 23h | dmr__uuid, dmr__instanceID |
| SetContrast( ) | 2Fh | 24h | dmr__uuid, dmr__instanceID |
| GetMute( ) | 2Fh | 25h | dmr__uuid, dmr__instanceID |
| SetMute( ) | 2Fh | 26h | dmr__uuid, dmr__instanceID |
| GetVolume( ) | 2Fh | 27h | dmr__uuid, dmr__instanceID |
| SetVolume( ) | 2Fh | 28h | dmr__uuid, dmr__instanceID |
| Stop( ) | 2Fh | 35h | dms__uuid, dms__instanceID, dmc__instanceID |
| Play( ) | 2Fh | 36h | dms__uuid, dms__instanceID, dmc__instanceID |
| Pause( ) | 2Fh | 37h | dms__uuid, dms__instanceID, dmc__instanceID |
| Seek( ) | 2Fh | 38h | dms__uuid, dms__instanceID, dmc__instanceID |

In the table above, some of the parameters used are explained here. The dms_uuid is the UUID of the DMS. The dms_uuid is obtained during discovery step and can be stored in the SDR of the IPMI Compatible DMC. The dmr_uuid is the UUID of the DMR. The dmr_uuid is also obtained during discovery step and can be stored in the SDR of the IPMI Compatible DMC. The dms_instanceID is the instanceID of the DMS. The dms_instanceID is returned when connection manager service is invoked. The dmr_instanceID is the instanceID of the DMR, dmc_instanceID is the instanceID of a specific digital media content. These instance IDs are also returned when connection manager service is invoked.

In certain embodiments, the IPMI application program 103 receives messages from the user interface, distinguishes an operation request or parameters of a specific operation, and constructs an IPMI message to the IPMI Compatible DMC 122. First the IPMI application program 103 determines whether the operation is an IPMI standard operation or an OEM IPMI operation. If the IPMI message contains standard network function code and accompanying command code, then the operation is an IPMI standard operation (e.g., accessing information in SDR). For example, when the operator wants to get an inventory of all digital media devices (including all DMSs and DMRs), the operator selected an option displayed on the user interface screen to "retrieve brief inventory of all digital media devices". The user interface module receives this input and sends a message to the IPMI application program 103 to "give me all the device information". As will be described below, in certain embodiments the SDR can be utilized stores brief inventory information such as uuid, ipAddr, and other brief inventory information. Once the IPMI application program 103 receives message from the user interface module, it determines that this operation can be completed by access the sensor data record (SDR) repository of the IPMI Compatible DMC 122 and that this is a standard IPMI operation. The IPMI application program 103 sends a standard IPMI command—getSDR( ) with a Total_Device_Record to the IPMI Compatible DMC 122. The Total_Device_Record is the total number of digital media devices stored in the SDR. As will be described below, the IPMI Compatible DMC 122 executes retrieve SDR information function in Total_Device_Record times and returns a list of digital media devices stored in the SDR. The IPMI application program 103 forwards the list to the user interface module and the user interface module can display the list of digital media devices on a device user interface screen.

If the operation is a non-standard IPMI operation such as rendering digital media contents or making audio or video adjustment to a DMR, then the IPMI message contains non-standard or OEM network function code and accompanying command code. The IPMI application program 103 will then construct an IPMI message with an OEM command and send the IPMI message to the IPMI Compatible DMC 122.

On the other hand, the IPMI message sent out involves information request, and the IPMI application program 103 will then receive an IPMI message back from the IPMI Compatible DMC 122 and the response contains the information requested. When information request involves multiple parameters and multiple results, the IPMI application program 103 will be able to identify the parameters and organize the responses individually such as in a table form so that the user interface is able to display the results in a user friendly format.

For example, when the operator wants to get an inventory of all digital media contents available at the DMSs, the operator selected an option displayed on the user interface screen to "retrieve inventory list of all digital media contents." The user interface module receives this input and sends an input to the IPMI application program 103 to "give me all the content information". Once the IPMI application program 103 receives an input from the user interface module, it determines that this operation will not be completed by using standard IPMI operation, and therefore this is a non-standard IPMI operation. This request can be fulfilled by requesting the IPMI compatible DMC 122 direct access a digital media content database 137 of the IPMI Compatible DMC 122. As will be described below, in certain embodiments, the digital media content database 137 stores digital media content inventory information such as content ID, and uuid and ipAddr of the DMS where the digital media content is stored, and other inventory information. The IPMI application program 103 sends an OEM IPMI command—getContent( ) with a Total_Number_Content to the IPMI Compatible DMC 122. The Total_Number_Content is the total number of digital media contents stored in the digital media content database 137. The IPMI Compatible DMC 122 performs retrieve digital media content inventory information from digital media content database 137 function for Total_Number_Content iterations and returns a list of digital media contents stored in the digital media content database 137. The IPMI application program 103 forwards the list to the user interface module and the user interface module displays the list of digital media contents on a digital media content user interface screen.

In certain embodiments, the IPMI Compatible DMC 122 includes at least a processor 127, a memory 124, and a network interface controller 126. The memory 124 includes at least a firmware 125. The firmware 125 may adhere in part to the Intelligent Platform Management Interface (IPMI) industry standard for any digital media device management and monitoring. The IPMI standard is well-known to those of ordinary skill in the industry, and therefore not described in detail herein. Rather, the IPMI Specification, version 2.0 rev. 1.0, published on Feb. 12, 2004 and Revised on Jun. 12, 2009, is incorporated herein by reference. The firmware 125 can have a network interface 129 for receiving an IPMI message 109 from the remote management devices through the network interface controller 126.

The firmware 125 has an IPMI management stack that, among other things, implement communication functionalities in accordance with IPMI. For example, the firmware 125 includes a network interface 129 for the remote management devices to access the IPMI Compatible DMC 122. When an operator wants to send a media management command through an IPMI message to the IPMI Compatible DMC 122 from a remote management device, the media management command is embedded in an IPMI message 109. The IPMI message 109 is embedded in one or more IP packets. The IP packets are sent through a network 107, a mobile communication network 106, or a wireless network 108. The IP packets are received at the network interface controller 126 of the IPMI Compatible DMC 122, and forwarded to the network interface 129 of the firmware. The network interface 129 can also include a network interface such as an IPMI LAN interface.

The firmware 125 also includes: (a) a standard IPMI component—sensor data record (SDR) 136 that stores brief inventory information of the digital media servers (DMSs) and digital media renderers (DMRs), (b) a Digital Media Device Database 138 that stores detailed information of the DMSs and DMRs, and (c) a Digital Media Content Database 137 that stores inventory of the digital media contents available on the digital media servers.

The Firmware 125 has an SDR repository 136. In certain embodiments, the IPMI Compatible DMC stores brief inventory information of the digital media devices including DMSs and DMRs connected to the DLNA network in the SDR repository 136. The SDR is usually indexed with a sequential number and the parameters stored in the SDR include: (a) device name, (b) device type, (c) uuid of the device, and (d) IP address of the device. The information are obtained through the discovery process of the DLNA protocol and stored in the SDR by using a standard IPMI command addSDR( ). In certain embodiments, the IPMI compatible DMC 122 uses an OEM SDR format to store SDR having DLNA devices related information.

The Firmware 125 has a digital media device database 138 and it is used to store more detailed inventory of the DMS devices and DMR devices. The information stored in the digital media device database 138 includes: (a) the device name, (b) device type, (c) uuid of the device, (d) IP address of the device, (e) description file of the device. Here, the uuid is a universal unique identification number used to identify each and every one of the device (DMS and DMR), IP address of the device is the IP address used to address each and every one of the device (DMS and DMR). The description file is an XML file used to describe a digital media server or a digital media renderer that contains detailed information about the device such as vendor-specific manufacturer information like the model name and number, serial number, manufacturer name, URLs to vendor-specific web sites, etc.

The digital media device database 138 can perform one or more of following major functions: (a) receive device information and store the received information to the digital media device database 138, and (b) transmit the device information stored in the digital media device database 138 to other programs when requested. Each device in the database 138 can be indexed by the uuid and the description file stores detailed information about the digital media device.

The Firmware 125 has a digital media content database 137 and it is used to store more detailed inventory of the digital media contents available in the DMS devices connected to the DLNA networks. The information stored in the digital media device database 138 includes: (a) the content name, (b) content type, (c) uuid of the DMS device where the content is stored, (d) IP address of the DMS device where the content is stored. The digital media content database 137 performs following major functions: (a) receive content information and store the received information to the digital media content database 137, and (b) transmit the content information stored in the digital media content database 137 to other programs when requested.

In certain embodiments, the IPMI message 109 is processed at an IPMI Message Module 130 of the IPMI Compatible DMC 122. The IPMI Message Module 130 performs a number of functions as described in following sections.

As a central processor of IPMI messages, the IPMI Message Module 130 receives IPMI messages from the IPMI application program 103, processes the IPMI messages received, and sends response IPMI messages back to the IPMI application program 103. When the IPMI Message Module 130 receives an IPMI message embedded in an IP packet, it first extracts the IPMI command from the IP packet, and determines the IPMI command received is a standard IPMI command or an OEM IPMI command based on a network function code in a network function field of the IPMI message.

In one embodiment, the IPMI Message Module 130 receives a standard IPMI command, such as get SDR information. The IPMI Message Module 130 then sent a get SDR command with a RecordID to the SDR to retrieve the sensor data records stored in the SDR. The RecordID is the identification number of SDR entries. In certain embodiments, the RecordID ranges from a first entry to a last entry. For example, if the RecordID is 0000h, the IPMI Message Module 130 will receive the SDR information of the first entry. If the RecordID is FFFFh, the IPMI Message Module 130 will receive the SDR information of the last entry. If the RecordID is a specific number between 0000h and FFFFh, the IPMI Message Module 130 will receive the SDR information of the RecordID-th entry.

In another embodiment, the IPMI Message Module 130 receives an OEM IPMI command, such as get all digital media content inventory. The IPMI Message Module 130 then sends this request to the DMC module 132 for processing. The DMC module will follow the command and retrieve the request information through the DLNA interface 134 and the DLNA network. In this example, the IPMI Message Module 130 will receive the inventory of the digital media contents from the DMC module 132.

Once the IPMI Message Module 130 receives the responses from the SDR repository 136 or the DMC module 132, the IPMI Message Module 130 constructs a response IPMI message. The IPMI Message Module 130 then embeds the information received from the SDR repository 136 or the DMC module 132 into an IPMI response message and sends the IPMI response message back to the IPMI application program 103 for display on the user interface.

When the operator needs some inventory information about the digital media servers, and the digital media renderers, this request can be fulfilled by direct access the sensor data record (SDR) of the IPMI Compatible DMC 122. The SDR stores brief inventory information such as uuid, ipAddr, and other brief inventory information. The IPMI application program 103 sends a standard IPMI command—getSDR( ) to the IPMI Message Module 130. The getSDR( ) command is then passed to IPMI Message Handler of the IPMI Message Module 130 and executed. The brief inventory information of the digital media devices are packaged in one or more IPMI response message and sent back to the IPMI application program 103.

In certain embodiments, the IPMI Compatible DMC 122 has a DMC module 132 that acts as a bridge between the IPMI domain 202, and the DLNA domain 204. For example, the DMC module 132 receives all OEM IPMI commands that are extracted from the IPMI messages by the IPMI message module 130. Then the DMC module 132 determines one or more appropriate DLNA/UPnP commands based on the OEM IPMI commands and the device information accessible by the DMC module 132. The DMC module 132 then transmit the DLNA/UPnP commands, through the DLNA interface 134, to the DMS 140 and the DMR 150 over the DLNA network 139.

In certain embodiments, the DMC module 132 receives OEM IPMI commands from the IPMI message module 130. The OEM IPMI commands are interpreted by the DMC module 132 along with associated parameters. For example, if the OEM IPMI commands received request information from a specific digital media renderer, then the associated parameters include the uuid, and the IP address of the device. The DMC module 132 constructs one or more DLNA actions according to the OEM IPMI command, and executes the DLNA actions through the DLNA interface 134. For example, if the DMC module 132 is requested to get information about a digital media content (contentID) stored on a digital media server (uuid_dms), then the DMC may pass this request to the DLNA interface 134. In certain embodiments, the DMC module 132 receives responses to the request from the DLNA interface 134. In the example above, the content information is sent back to the DMC module 132 from the DLNA interface 134.

In certain embodiments, the DMC module 132 can also execute OEM command through the DLNA Interface 134. The DMC module 132 can also be used to retrieve digital media device and content information from the digital media devices on the DLNA network 139. The DMC module 132 can call functions on the DLNA Interface 134 to return: (a) information of a digital media server, (b) information of a digital media content on a digital media server, (c) information of a digital media renderer. Once the DMC module 132 receives the information, the DMC module 132 then stores (a) the inventory information of the digital media server and the digital media renderer in the SDR repository 136, (b) the detailed information of the digital media server and the digital media renderer in the digital media device database 138, (c) the digital media content information in the digital media content database 137.

The Digital Living Network Alliance (DLNA) is an industrial standard that defines interoperability guidelines to enable sharing of digital media between multimedia devices. These guidelines are built upon existing public standards, but the guidelines themselves are private. These guidelines specify a set of restricted ways of using the standards to achieve interoperability. The DLNA defines three major categories of intelligent devices: Home Network Devices: Mobile Handheld Devices; and Home Infrastructure Devices.

DLNA uses Universal Plug and Play (UPnP) protocols for media management, discovery, and control. Universal Plug and Play (UPnP) is a another set of networking protocols that permits networked devices, such as digital media server (DMS), digital media renderer (DMR), and digital media controller (DMS), personal computers, printers, Internet gateways, Wi-Fi access points and mobile devices to seamlessly discover each other's presence on the network and establish functional network services for data sharing, communications, and entertainment.

The UPnP architecture supports zero configuration networking. An UPnP compatible device from any vendor can dynamically join a network, obtain an IP address, announce its name, convey its capabilities upon request, and learn about the presence and capabilities of other devices. In the case of digital media distribution, a Dynamic Host Configuration Protocol (DHCP) server and a Domain Name System (DNS) server are usually implemented in the digital media controller (DMC). The network may be internet, mobile communication network, or a private network. Devices can disconnect from the network automatically without leaving state information.

The remote management device renders control and management of digital media servers and digital media renderers through OEM IPMI messages. The control and management function includes many of the functions and commands in the DLNA protocol. DLNA protocol offers following services: Connection Manager, Content Directory, Rendering Control, and AV Transport.

The DLNA domain 204 includes: (a) a DLNA interface 134, (b) a digital media server 150, and (c) a digital media renderer 140. The DLNA interface 134 functions as a DLNA control point according to the guideline of the DLNA, and it manages the operations of DMSs 150-J, and DMRs 140-I connected to the DLNA network 139. Although in FIG. 2, the DMSs and DMRs are simplified as a single DMS 150, and a single DMR 140, it is understood that the DMS 150 and the DMR 140 can be extended to multiple DMSs 150-J, J=1, 2, . . . , M, and DMRs 140-I, I=1, 2, . . . , N without departing the spirit and scope of the present disclosure.

The DMS 150 contains digital media contents that the operator wants to render (e.g. play, display or listen to) on a digital media renderer (DMR) 140. The DMS 150 contains or has access to a variety of entertainment content, either stored locally or stored on an external device that is accessible via the DMS 150. The DMS 150 is able to access its content and transmit it to another device via the network using a transfer protocol. The content exposed by the DMS 150 may include arbitrary types of content including video, audio, animations, and/or still images. The content is transmitted over the network using a transfer protocol and data format that is understood by both the DMS 150 and the DMR 140. The DMS 150 may support one or multiple transfer protocols and data formats for each content item. The DMS 150 is also able to convert the format of a given content item into another format on the fly. Examples of a DMS 150 include a VCR, CD/DVD player/jukebox, camera, camcorder, PC, set-top box, satellite receiver, audio tape player, etc.

The DMS 150 is used to locate content that is available via a home network and its primary purpose is to allow the DLNA interface 134 to enumerate (i.e. browse or search for) content items that are available for the operator to play/display. The DMS 150 contains: (a) a Content Directory Service [CDS] 150-A, (b) a Connection Manager Service [CMS] 150-B, (c) an optional AV Transport Service [AVT] 150-C, and (d) an optional Transfer Server 150-D (depending on the supported transfer protocols).

The Content Directory Service 150-A provides a set of actions that allow the DLNA interface 134 to enumerate the content that the Server can provide to a home network. The primary actions of this service are CDS::Browse( ) and CDS::Search( ). This action allows the DLNA interface 134 to obtain detailed information about each content item that the digital media renderer 140 can provide. This information (i.e. meta-data) includes properties such as its name, artist, date created, size, etc. Additionally, the returned meta-data identifies the transfer protocols and data formats that are supported by the DMS 150 for that particular Content Item. The DLNA interface 134 uses this information to determine if a given digital media renderer 140 is capable of rendering that content in its available format.

The Connection Manager Service 150-B is used to manage the connections associated with a particular device. The primary action of the Connection Manager Service 150-B (within the context of a DMS) is CMS::PrepareForConnection( ). When implemented, this optional action is invoked by the DLNA interface 134 to give the DMS 150 an opportunity to prepare itself for an upcoming transfer. Depending on the specified transfer protocol and data format, this action may return the InstanceID of an AVTransport service that the DLNA interface 134 can use to control the flow of this content. As described below, this InstanceID is used to distinguish multiple (virtual) instances of the AVTransport service, each of which is associated with a particular connection to digital media renderer. Multiple (virtual) instances of the AVTransport service allow the DMS 150 to support multiple DMRs at the same time. When the DLNA interface 134 wants to terminate this connection, it should invoke the DMS 150's CMS::ConnectionComplete( ) action (if implemented) to release the connection.

The optional AV Transport Service 150-C is used by the DLNA interface 134 to control the "playback" of the content that is associated with the specified AVTransport. This includes the ability to Stop, Pause, Seek, etc. Depending on the supported transfer protocols and/or data formats, the DMS 150 may or may not implement this service. If supported, the DMS 150 can distinguish between multiple instances of the service by using the InstanceID that is included in each AVTransport action. New instances of the AVTransport service are created via the CMS::PrepareForConnection( ) action. A new Instance Id is allocated for each new Service Instance.

In certain embodiments, the DMSs 150 includes digital multimedia contents such as television programs, advertisements, traffic information, directional displays, menus, information, music, videos, movies, still images, animations, interactivity and many other multimedia forms. In certain embodiments, these contents can be stored in a series of DMSs. The contents can be indexed by the uuid, the name of the DMS, and a digital media number (e.g., contentID). As described above, the inventory of these multimedia contents can be retrieved and stored in the digital media database 137.

In certain embodiments, all content directory service, connection manager service, AVTransport service functions can be invoked by the DLNA Interface 134 by using SOAP control messages. The DMS receives the SOAP message, determines the function to perform and performs the function requested. The DMR 140 receives digital media content from a DMS 150 via the DLNA network 139. Examples of the DMRs 140 include TV, stereo, network-enabled speakers, MP3 players, Electronic Picture Frame (EPF), a music-controlled water fountain, etc. The type of content that the DMR 140 can receive depends on the transfer protocols and data formats that it supports. Some DMRs may only support one type of content (e.g. audio or still images), whereas other DMRs may support a wide variety of content including video, audio, still images.

The DMR 140 renders (e.g. play, display and/or listen to) digital media content received from a DMS over the DLNA network. This includes a wide variety of devices including TVs, stereos, speakers, hand-held audio players, music controlled water-fountain, etc. Its main feature is that it allows the DLNA interface 134 to control how content is rendered (e.g. Brightness, Contrast, Volume, Mute, and Close Caption, etc). Additionally, depending on the transfer protocol that is being used to obtain the content from the network, the DMR 140 may also allow the operator to control the flow of the content (e.g. Stop, Pause, Seek, etc).

The DMR 140 can include (a) a Rendering Control Service [RCS] 140-A, (b) a Connection Manager Service 140-B, (c) an optional AVTransport Service 140-C, and (d) optional transfer client service 140-D, (depending on which transfer protocols are supported). In order to support rendering devices that are capable of handling multiple content items at the same time (e.g. an audio mixer such as a Karaoke device), the Rendering Control Service 140-A and AVTransport Services 140-C contain multiple independent (logical) instances of these services. Each (logical) instance of these services is bound to a particular incoming connection. This allows the DLNA interface 134 to control each of incoming content independently from each other. Multiple logical instances of these services are distinguished by a unique 'InstanceID' which references the logical instance. Each action invoked by the DLNA interface 134 contains the Instance ID that identifies the correct instance.

The Rendering Control Service 140-A provides a set of actions that allow the DLNA interface 134 to control how the DMR 140 renders a piece of incoming content. This includes rendering characteristics such as Brightness, Contrast, Volume, Mute, and Close Caption etc. The Rendering Control service 140-A supports multiple, dynamic instances, which allows a DMR to "mix together" one or more content items (e.g. a Picture-in-Picture window on a TV or an audio mixer device). New instances of the service are created by the CMS::PrepareForConnection( ) action. If the CMS::PrepareForConnection( ) action is not implemented the default value 0 should be used for InstanceID.

The Connection Manager Service 140-B is used to manage the connections associated with a device. Within the context of a DMR, the primary action of this service is the CMS::GetProtocolInfo( ) action. This action allows a digital media control point to enumerate the transfer protocols and data formats that are supported by the DMR. This information is used to predetermine if a DMR is capable of rendering a specific content item. A DMR may also implement the optional CMS::PrepareForConnection( ) action. This action is invoked by the DLNA interface 134 to give the DMR 140 an opportunity to prepare itself for an upcoming transfer. Additionally, this action assigns a unique ConnectionID that can be used by a 3rd-party control point to obtain information about the connections that the DMR is using. Also, depending on the specified transfer protocol and data format being used, this action may return a unique AVTransport InstanceID that the Control Point can use to control the flow of the content (e.g. Stop, Pause, Seek, etc). Lastly, the CMS::PrepareForConnection( ) action also returns a unique Rendering Control InstanceID which can be used by the Control Point to control the rendering characteristics of the associated content as described above. When the Control Point wants to terminate a connection, it should invoke the Renderer's CMS::ConnectionComplete( ) action (if implemented) to release the connection. If the CMS::PrepareForConnection( ) action is not implemented the default value 0 should be used for InstanceID.

The AVTransfer Service is optional and is used by the DLNA interface 134 to control the flow of the associated content. This includes the ability to Play, Stop, Pause, Seek, etc. Depending on transfer protocols and/or data formats that are supported, the DMR may or may not implement this service. In order to support DMR that can simultaneously handle multiple content items, the AVTransport service 140-C may support multiple logical instances of this service. As described above, AVTransport InstanceIDs are allocated by the CMS::PrepareForConnection( ) action to distinguish between multiple service instances.

All rendering control service, connection manager service, AVTransport service functions are invoked by the DLNA Interface 134 by using an SOAP control message. The DMS receives the SOAP message, determines the function to perform and performs the function requested.

In certain embodiments, the DLNA interface 134 functions as a DLNA control point or an UPnP controller. The major functions of the DLNA interface 134 include:

a) Discover AV Devices: Using UPnP's Discovery mechanism, DMSs and DMRs in a home network are discovered.

b) Locate Desired Content: Using the DMS's CDS::Browse( ) or CDS::Search( ) actions, a desired Content Item is located. The information returned by CDS::Browse( )/Search( ) includes the transfer protocols and data formats that the DMS supports to transfer the content to the home network.

c) Get Renderer's Supported Protocols/Formats: Using the DMR's CMS::GetProtocolInfo( ) action a list of transfer protocols and data formats supported by the DMR is returned to the DLNA interface.

d) Compare/Match Protocols/Formats and Check Playability: The protocol/format information returned by the ContentDirectory for the desired Content Item is matched with the protocol/format information returned by the MediaRenderer's CMS::GetProtocolInfo( ) action. The DLNA interface selects a transfer protocol and data format that are supported by both the DMS and DMR.

e) Configure Server/Renderer: The device's CMS::PrepareForConnection( ) action informs the DMS and DMR that an outgoing/incoming connection is about to be made using the specified transfer protocol and data format that was previously selected. Depending on the selected transfer protocol, either the DMS or DMR will return an AVTransport InstanceID. This InstanceID is used in conjunction with the device's AVTransport Service (i.e. the device returning the AVTransport InstanceID) to control the flow of the content (e.g. AVT::Play( ), AVT::Stop( ), AVT::Pause( ), AVT::Seek( ), etc). Additionally, the DMR will return Rendering Control InstanceID that is used by the DLNA Interface to control the Rendering characteristics of the content.

f) Select Desired Content: Using the AVTransport service (whose InstanceID is returned by either the Server or Renderer), invoke the AVT::SetAVTransportURI( ) action to identify the content item that needs to be transferred.

g) Start Content Transfer: Using the AVTransport service, invoke one of the transport control actions as desired by the user (e.g. AVT::Play( ), AVT::Stop( ), AVT::Seek( ), etc).

h) Adjust Rendering Characteristics: Using the DMR's Rendering Control service [RCS], invoke any rendering control actions as desired by the user (e.g. adjust brightness, contrast, volume, mute, etc).

i) Repeat: Select Next Content: Using either the AVT:: SetAVTransportURI( ) or AVT::SetNextAVTRansportURI( ) actions, identify the next content item that is to be transferred from the same Server to the same DMR. Repeat as needed.

j) Cleanup Server/Renderer: When the session is terminated and DMS and DMR are no longer needed in the context of the session, the DMS and DMR's CMS:: ConnectionComplete( ) action is invoked to close the DMS's connection.

The DLNA interface 134 uses Universal Plug-and-Play (UPnP) Protocol for the management of the DMS 150 and DMR 140. The UPnP protocol includes following steps: (a) Addressing, (b) Discovery, (c) Description, (d) Control, (e) Event notification, and (f) presentation.

Addressing: The foundation for UPnP networking is IP addressing. Each device (DMS or DMR) must implement a DHCP client and search for a DHCP server when the device is first connected to the network. If no DHCP server is available, the device must assign itself an address. The process by which an UPnP device assigns itself an address is known within the UPnP Device Architecture as AutoIP.

Discovery: Once the device has established an IP address, the next step in UPnP networking is discovery. The UPnP discovery protocol is known as the Simple Service Discovery Protocol (SSDP). When a device is added to the network, SSDP allows that device to advertise its services to the DLNA interface on the network. Similarly, when the DLNA interface is added to the network, SSDP allows that DLNA interface to search for devices of interest on the network. The fundamental exchange in both cases is a discovery message containing a few essential specifics about the device or one of its services, for example, its type, identifier, and a pointer to more detailed information. The device identifier is also called Universally Unique Identifier (UUID). The inventory information retrieved through Discovery step is brief and may include a digital media device number (UUID), the type of device. This information is transferred back to the DMC module 132 from the DLNA interface 134 (control point). The information is stored by the DMC module 132 to the SDR repository 136.

Description: After the DLNA interface has discovered a device, the DLNA interface still knows very little about the device. For the DLNA interface to learn more about the device and its capabilities, or to interact with the device, the DLNA interface must retrieve the device's description from the URL provided by the device in the discovery message. The UPnP description for a device is expressed in XML and includes vendor-specific manufacturer information like the model name and number, serial number, manufacturer name, URLs to vendor-specific web sites, etc. The description also includes a list of any embedded devices or services, as well as URLs for control, eventing, and presentation. For each service, the description includes a list of the commands, or actions, to which the service responds, and parameters, or arguments, for each action; the description for a service also includes a list of variables; these variables model the state of the service at run time, and are described in terms of their data type, range, and event characteristics. The information retrieved through Description process is more detailed and this information is transferred back to the DMC module 132 from the DLNA interface 134. The information includes two types: (a) device description, and (b) service description. The device description (property information) is stored by the DMC module 132 to the digital media device database 138. The property information may include IP address (either global or internal IP address), the digital media device number, manufacturer model number, the numbers and types of management function/operations available for the device, the status of the device, device driver type, device driver pointer, any alerts currently shown on the device, any device specific information and its detailed settings information. The property information of the digital media contents may include IP address (either global or internal IP address) of the DMS, the digital media device number, the digital media number on the DMS, the type of the content, the length of the content, specific DMR require to play the digital media content, any DMR scheduled to play the digital media contents, and any other information and its detailed settings information.

Control: Having retrieved a description of the device, the DLNA interface can send actions to a device's service. To do this, the DLNA interface sends a suitable control message to the control URL for the service (provided in the device description). Control messages are also expressed in XML using the Simple Object Access Protocol (SOAP). Much like function calls, the service returns any action-specific values in response to the control message.

Event notification: an additional capability of UPnP networking is event notification, or eventing. The event notification protocol defined in the UPnP Device Architecture is known as General Event Notification Architecture (GENA). The UPnP description for a service includes a list of actions the service responds to and a list of variables that model the state of the service at run time. The service publishes updates when these variables change, and the DLNA interface may subscribe to receive this information. The service publishes updates by sending event messages. Event messages contain the names of one or more state variables and the current value of those variables. These messages are also expressed in XML. A special initial event message is sent when the DLNA interface first subscribes; this event message contains the names and values for all evented variables and allows the subscriber to initialize its model of the state of the service. To support scenarios with multiple DLNA interfaces, eventing is designed to keep all DLNA interfaces equally informed about the effects of any action. Therefore, all subscribers are sent all event messages, subscribers receive event messages for all "evented" variables that have changed, and event messages are sent no matter why the state variable changed.

Presentation: the final step in UPnP networking is presentation. If a DMR is a television set, and DMS is a digital video recorder (DVR), then the DLNA interface can retrieve a digital media content from the DMS, direct the content to the DMR, and display the content on the DMR, and depending on the capabilities of the DMS and DMR, allow an operator to control the device (DMS and DMR) and/or view device (DMS and DMR) status. The degree to which each of these can be accomplished depends on the specific capabilities of the devices.

In addition to the IPMI protocol and UPnP protocol used in the IPMI domain 202 and UPnP domain 204, respectively, an out-of-band transfer protocol 208 is used for the communication between the DMS 150 and the DMR 140. This out-of-band transfer protocol can be direct cable connections, such as component video cable, video cable, DVI cables, and HDMI cables. Also other protocol such as IP, in both wired or wireless, Wi-Fi, LAN, WAN, blue-tooth, or Zigbee, can be used.

Further, after the DMC module receives an IPMI message from the remote device, the IMPI compatible DMC determines, based on the media management function and the associated parameters, one or more DLNA actions that need to be invoked in order to perform the function. Accordingly, the DMC module 132 invokes those functions through the DLNA interface 134.

In one embodiment, once the DLNA interface 134 receives an OEM IPMI command from the DMC module 132, the DLNA interface 134 determines the specific functions need to be called to perform the OEM command. For example, if the OEM IPMI command is to play a digital media content on a DMS to a DMR. The DLNA interface 134 determines that for this command, it requires at least three DLNA actions: (a) sending a control message according to SOAP protocol to the connection manager service of the DMS to prepare connection, (b) sending a control message according to SOAP protocol to the connection manager service of the DMR to prepare connection, and (c) sending a control message according to SOAP protocol to the AVT service of the DMS to play the specific digital media content.

If the OEM IPMI command is to retrieve a list of content stored on a digital media server, then the DLNA interface 134 determines that for this command, it requires at least following four DLNA actions: (a) sending a control message according to SOAP protocol to the content directory service of the DMS to browse the content inventory from the DMS, (b) the content information is received over an SOAP response message from the DMS, (c) transmitting the content information to the DMC module 132, and (d) repeat DLNA actions (b) and (c) for each digital media content stored in the DMS. Other examples of OEM IPMI commands such as stop, pause, fast forward, rewind, audio adjustment, and video adjustment are implemented in similar way and may involve more or less DLNA actions depending on the specific commands.

Figure 3:
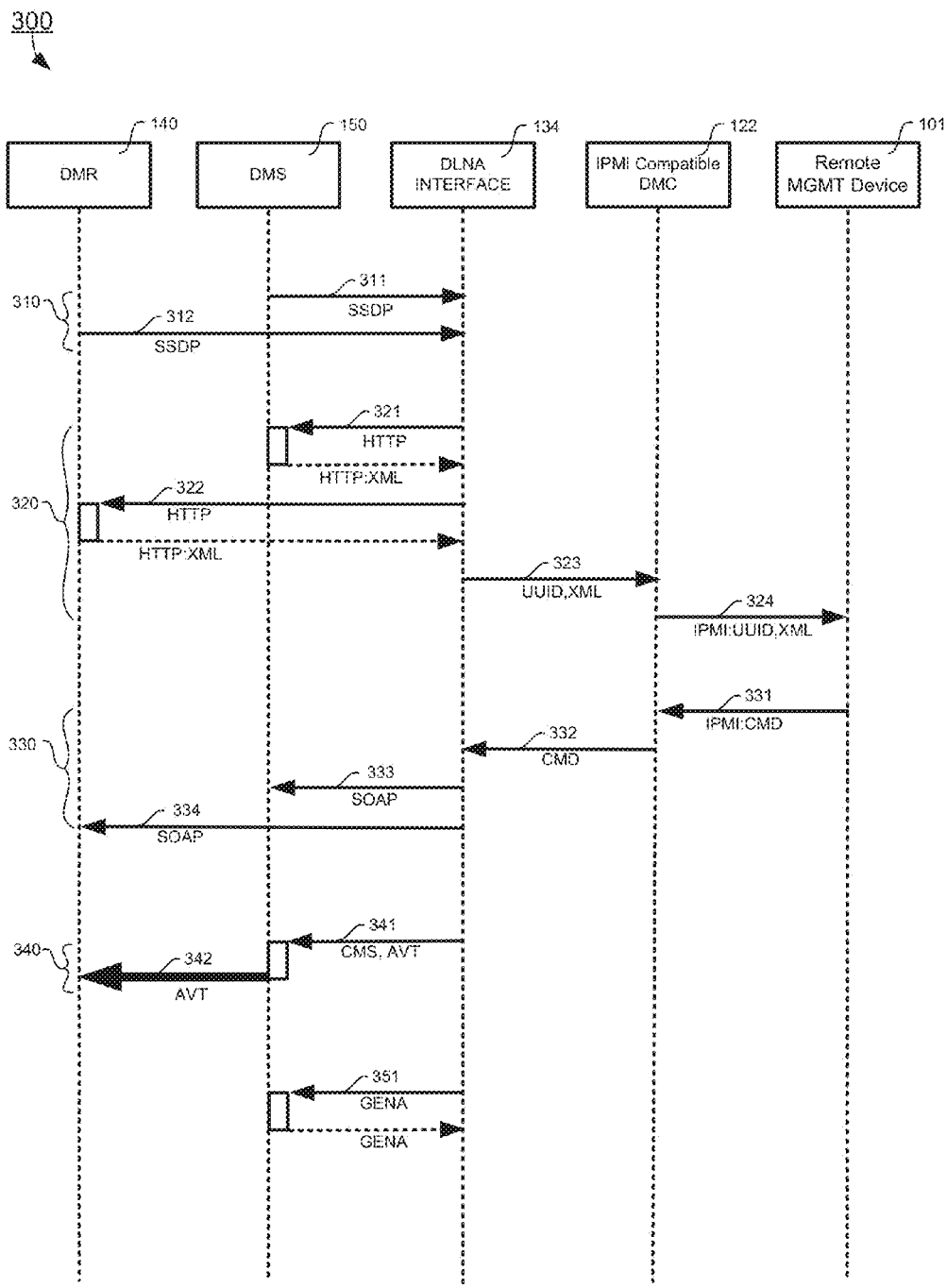
FIG. 3 shows exemplary interactions among components of the remote management system and DLNA devices according to one embodiment of the present disclosure.

Referring now to FIG. 3, some of the exemplary interactions between a DLNA Interface 134, a DMS 150, a DMR 140, an IPMI Compatible DMC 122, and a remote management device 101 connected to a home network are shown according to one embodiment of the present disclosure.

The DLNA Interface 134 of the IPMI Compatible DMC 122 uses a Simple Service Discovery Protocol (SSDP) protocol to discover all devices connected to a network. There are two devices: the DMS 150 and the DMR 140 connected as shown in FIG. 3. When the DLNA Interface 134 is added to the network, SSDP allows the DLNA Interface 134 to search for digital media devices of interest on the network. Similarly, when the DMS 150 and DMR 140 are added to the network, SSDP allows these devices 150 and 140 to advertise its services to the DLNA Interface 134 on the network. The advertisement of the services provided by the DMS 150 and DMR 140 are commands such SSDP::NOTIFY( ): The fundamental exchange in both cases is a discovery message containing a few essential specifics about the device, its device number, the IP address, or one of its services, for example, its type, identifier, and a pointer to more detailed property information. The advertising steps are shown in FIG. 3 as steps 311, and 312. The DMS 150 advertises its presence and its services in the network to the DLNA Interface 134 in step 311. The DMR 140 advertises its presence and its services in the network to the DLNA Interface 134 in step 312.

Once the DLNA interface 134 has discovered the DMS 150 and DMR 140, and established an IP address through a DHCP service and their digital media device number, i.e. UUID, the IP address and the UUID for the device are sent back to the DMC module 132 to be stored in the sensor data record (SDR) 136 of the IPMI Compatible DMC 122. The DMC module 132 goes through each one of the connected devices including the DMR 140-I, I=1, 2, . . . , N, and the DMSs 150-J, J=1, 2 . . . , M, as shown in FIG. 1, to discover all digital media devices connected to the home network. Once all devices (DMRs and DMSs) are discovered, the DLNA interface 134 transmit all device information to the DMC module 132.

The DMC module 132 uses an "Add SDR" Command to store information of each device in the SDR Repository and a "RecordID" is returned once a device is added to the SDR Repository. This "RecordID" is unique and corresponds to each individual device.

The next step in UPnP networking is Description as shown as step group 320. After the DLNA Interface 134 has discovered a device (the DMS 150 or the DMR 140), the DLNA Interface 134 still knows very little about these devices. For the DLNA Interface 134 to learn more about these devices and their capabilities, or to interact with the device, the DLNA Interface 134 retrieves the device's description from the URL provided by the device in an XML file through an HTTP message from the devices. The DLNA interface 134 sends an HTTP message to the DMS 150 to retrieve the description of DMS 150 in step 321. The DLNA interface 134 sends another HTTP message to the DMR 140 to retrieve the description of DMR 140 in step 322. The devices may contain other logical devices, as well as functional units, or services. The DLNA Interface 134 also retrieves the descriptions of services from the URL provided by the device in a separate XML file. The UPnP description for a device is expressed in XML and includes vendor-specific manufacturer information like the model name and number, the serial number, the manufacturer name, URLs to vendor-specific Web sites, etc. The description also includes a list of any embedded devices or services, as well as URLs for control, eventing, and presentation. For each service, the description includes a list of the commands, or actions, to which the service responds, and parameters, or arguments for each action; the description for a service also includes a list of variables; these variables model the state of the service at run time, and are described in terms of their data type, range, and event characteristics. The section on Description below explains how devices are described and how DLNA interfaces retrieve those descriptions.

In addition to defining non-standard devices (which may contain both vendor-defined and standard embedded devices and services), UPnP vendors may add embedded devices and services to standard devices.

In addition to defining non-standard services, UPnP vendors may add actions and services to standard devices, and may embed standard services and devices in non-standard devices.

The device descriptions and the service descriptions of the DMS 150 and DMR 140 including UUID, and XML file are sent to the IPMI Compatible DMC 122 in step 323, and then the IPMI Message Module 130 of the IPMI Compatible DMC 122 embeds the information into one or more IPMI messages and sends back to the remote management devices in step 324. The detailed device information is stored in the digital media device database 138, and detailed digital media servers and their services are stored in the digital media content database 137.

The step group 330 shows the control operations. After the DLNA Interface 134 has retrieved the device the device description and the service description of the device, for example, the DLNA Interface 134 can send actions to the device to perform a function.

When the operator wants to view an inventory of the digital media contents stored in the DMS 150, a query command (e.g., CMD=13h) is sent through an IPMI message as shown in step 331. The CMD is transmitted through the IPMI Compatible DMC 122 and sent to the DLNA interface 134 as shown in step 332. A control messages 330 is also expressed in XML using the Simple Object Access Protocol (SOAP). The DLNA interface 134 then translates the CMD=13h as a CDS::FreeFormQuery(dms_uuid) and sends out a SOAP:: req(CDS::FreeFormQuery(dms_uuid)) to obtain the content inventory of the DMS 150 with the dms_uuid as shown in step 333. The inventory of the content of the DMS 150 will be sent back as a SOAP::resp( ) to the DLNA interface 134, IPMI Compatible DMC 122, and the remote management device 101 accordingly. The Mobile IPMI App 103 will be able to display the inventory of the digital media content.

The most common task that an operator wants to perform is to render (i.e. playback) individual items of content such as a song, a video, or a picture stored on a source on a specific rendering device.

The operator interacts with a user interface on the remote management device 101 to locate and select the desired content on the DMS 150 and to select the target DMR 140. The DLNA interface 134 coordinates and manages the operation of the DMS 150 and DMR 140 as directed by the operator (e.g. play, stop, pause) in order to accomplish the desired task (e.g. play "MyFavorite" music). Additionally, the IPMI app 103 of the remote management device 101 provides an UI for the operator to interact with in order to control the operation of the device(s) (e.g. to select the desired content).

The IPMI app 103 of the remote management device 101 coordinates the operation of the DMS 150 and the DMR 140, usually in response to operator interaction with the UI. In certain embodiments, the remote management device 101 is not an UPnP device, e.g. it is not visible as a device on the network, since it does not provide any UPnP services. The remote management device 101 invokes services on other UPnP devices in order to trigger some desired behavior of the remote devices.

The next step in UPnP networking is presentation as shown as step group 350. When the operator wants to play a specific piece of digital media content in the DMS 150 with dms_uuid, on the DMR 140 with dmr_uuid, with a dmc_instanceID for the digital media content, a serial of operations will follow. For example, the operator needs to select a DMR, select a digital media content, and play to the digital media on the DMR. These operation will be completed by sending out: play(dms_uuid, dms_uuid:dmc_instanceID, dmr_uuid) from the remote management device 101, to the IPMI Compatible DMC 122, and the DLNA interface 134. The DLNA interface 134 will:

(a) send an SOAP control message containing CMS::PrepareForConnection (dms_uuid, dms_instanceID)) to the DMS 150 to prepare for AVTransport connection and dms_instanceID for the DMS is returned as shown in step 333;

(b) send an SOAP control message containing CMS::PrepareForConnection (dmr_uuid, dmr_instanceID)) to the DMR 140 to prepare for AVTransport connection and dmr_instanceID for the DMR is returned as shown in step 334;

(c) send an SOAP control message containing AVT::Play (dms_uuid, dms_instanceID, dmc_instanceID) to the DMS 150 to render the selected content specified by the dmc_instanceID from the DMS specified as UUID2, as shown in step 341; and (d) When the AVTransport::Play(dms_uuid, dms_instanceID, dmc_instanceID) is sent out, an AVTransport service is activated using an out-of-band transfer protocol and start to transfer the selected digital media content (instanceID) from the DMS 150 (dms_uuid) to the DMR 140 (dmr_uuid) until the content rendering is completed or interrupted by the operator as shown in the step 352.

Other commands can also be used here. For example, when the DMR 140 is a TV, and the TV may include many display adjustment functions: such as Brightness adjustment, Contrast adjustment, Volume adjustment, and Sound Mute adjustment. These adjustments are implemented by a set of Rendering Control Service functions: GetBrightness( ), SetBrightness( ), GetContrast( ), SetContrast( ), GetVolume( ), SetVolume( ), GetMute( ), and SetMute( ).

The next step in UPnP networking is eventing as shown as step group 350. An UPnP description for a service includes a list of actions the service responds to and a list of variables that model the state of the service at run time. The service publishes updates when these variables change, and the DLNA interface 134 may subscribe to receive this information as shown in step 351 according to General Event Notification Architecture (GENA). The service publishes updates by sending event messages back to the DLNA interface 134. The returned event messages contain the names of one or more state variables and the current value of those variables. These messages are also expressed in XML. A special initial event message is sent when the DLNA interface 134 first subscribes (step 351), and this event message contains the names and values for all evented variables and allows the subscriber to initialize its model of the state of the service. To support scenarios with multiple the DLNA interfaces, eventing is designed to keep all the DLNA interfaces equally informed about the effects of any action. Therefore, all subscribers are sent all event messages, subscribers receive event messages for all evented variables that have changed, and event messages are sent no matter why the state variable changed (either in response to a requested action or because the state the service is modeling changed).

Once the AVTransport is completed, the DLNA interface 134 will send ConnectionManager::connectionComplete (dms_uuid) and ConnectionManager::connectionComplete (dmr_uuid) to the connection managers of the DMS 150 and the DMR 140 to close the connections between the DMS 150 and the DMR 140.

Figure 2:
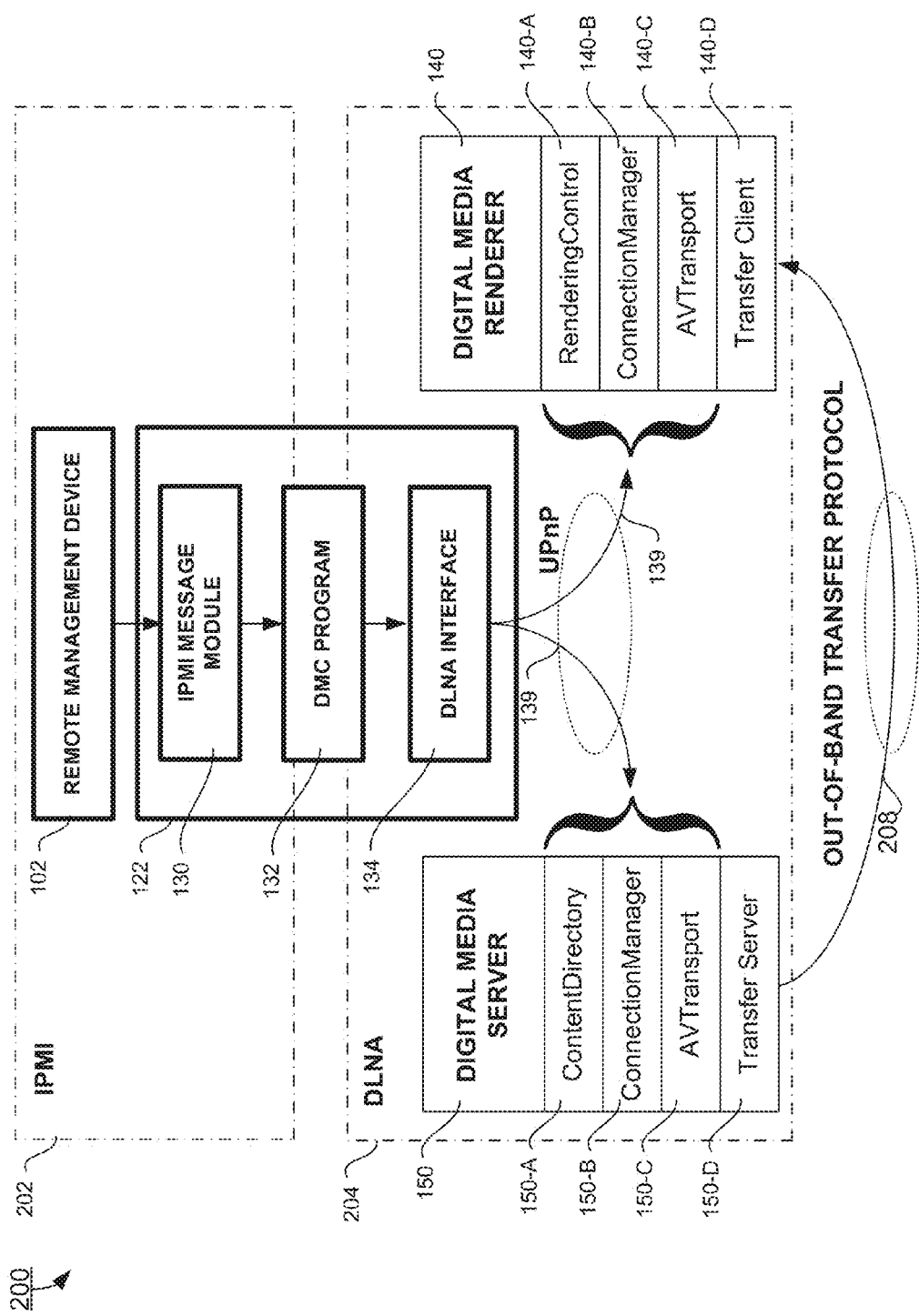
FIG. 2 shows a simplified block diagram of the remote management system according to one embodiment of the present disclosure.
Figure 4:
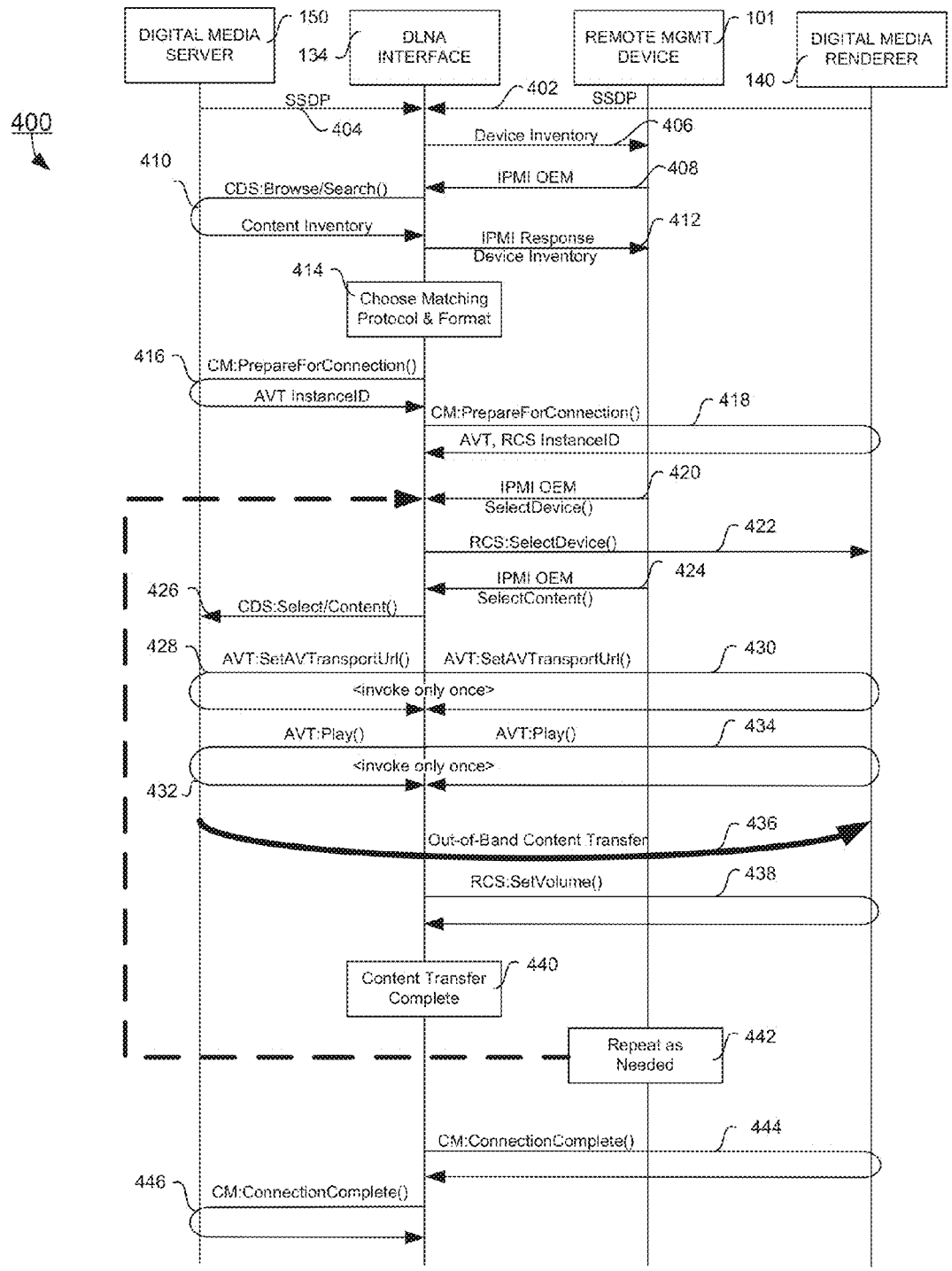
FIG. 4 shows exemplary interactions among components of the remote management system and DLNA devices according to one embodiment of the present disclosure.

Referring now to FIGS. 1, 2, and 4, another example of major interactions and operations 400 among the major components of the DLNA networks is shown as an operator manages digital media content and digital signage display system according to one embodiment of the present disclosure. The system includes the major components as shown in FIGS. 1 and 2: (a) a remote management device 101, (b) a DLNA interface 134, (c) a digital media server (DMS) 150, and (d) a digital media renderer (DMR) 140. The communication between the remote management device 101 and the DLNA interface 134 is IP based and IPMI messages are embedded in the IP packets. The communication between the DLNA interface 134, the DMS 150 and the DMR 140 follows the UPnP protocol.

At STEP 402 and 404, when the DMR 140 and the DMS 150 are connected to the DLNA network, the DMS 150 and the DMR 140 send out SSDP notify message to the DLNA interface 134 as a part of discovery process. The uuid and the IP address of the DMR 140 and DMS 150 are discovered by the DLNA interface 134.

At STEP 406, the brief device inventory information of the DMR 140 and the DMS 150 is transmitted to the remote management device 101, and saved in the SDR repository 136 by the DMC module 132, and detailed device information is saved in the digital media device database 138.

At STEP 408, an IPMI message 109 is embedded in an IP packet and sent over a network 107 or 108. The IPMI message 109 is received at the network interface controller 126, and passed onto the network interface 129, to the IPMI message module 130, where an OEM IPMI command to get the content inventory embedded in the IPMI message 109 is extracted from the IP packets and sent to the DMC module 132. Each DMS is represented by a universal unique identification number uuid, and in this example, the DMS 150 is represented as dms_uuid. If the remote management device 101 only want to retrieve the content inventory of a specific DMS having an dms_uuid as its uuid, the dms_uuid is passed by the IPMI message 109 as the responder's logic unit number (LUN) of the encapsulated data of the IPMI message 109.

At STEP 410, the DMC module 132 of the IPMI Compatible DMC 122 receives the OEM IPMI command, and forwarded to command to the DLNA interface 134, and then the DLNA interface 134 sends an SOAP control message containing DLNA action such as CDS:Browse(dms_uuid) or CDS:Search(dms_uuid) to the DMS 150 to browse or search the content directory information. The content information retrieved from the DMS 150 will be sent back through an SOAP response message.

At STEP 412, the content inventory of the DMS 150 is then sent as a response to the OEM IPMI command to retrieve content information through another IPMI message 109 embedded in one or more IP packets back to the remote management device 101. The content inventory may be used by an operator to browse, view, select, or render(play) the digital media content available on the DMS 150.

Once the digital media content inventory and digital media device inventory are collected, they are stored in the digital media content database 137 and the digital media device database 138, respectively, as well as the remote management device 101 or 102. The SDR repository 136 of the IPMI Compatible DMC 122 also stores a brief inventory of all DMRs connected to the DLNA network.

The digital media device database 138 is used to store more detailed property information about each of the connected devices such as product specific information. For example, a large LED display panel may have information such as a name, a model number, a display location, IP address/device address, current status, current input sources, current settings, and any alerts status currently shown on the device etc.

At STEP 414, the DLNA interface 134 matches the protocols and formats of the digital media contents from both the DMS 150 and the DMR 140.

At STEP 416, the DLNA interface 134 sends an SOAP control message containing the command CM:PrepareForConnection(dms_uuid) to the DMS 150 to give the DMS 150 an opportunity to prepare itself for an upcoming transfer. Depending on the specified transfer protocol and data format, this action returns an InstanceID of an AVTransport service that the DLNA interface 134 can use to control the flow of this content (e.g. Stop, Pause, Seek, etc). This InstanceID is used to distinguish multiple (virtual) instances of the AVTransport service, each of which is associated with a particular connection to DMR.

At STEP 418, the DLNA interface 134 sends an SOAP control message containing the command CMS:PrepareForConnection(dmr_uuid) to the DMR 140. In order to support rendering devices that are capable of handling multiple content items at the same time (e.g. an audio mixer such as a Karaoke device), the Rendering Control Service 140-A and AVTransport Services 140-C contain multiple independent (logical) instances of these services. Each (logical) instance of these services is bound to a particular incoming connection. This allows the DLNA interface 134 to control each of incoming content independently from each other. Multiple logical instances of these services are distinguished by a unique 'InstanceID' which references the logical instance. Each action invoked by the DLNA interface 134 contains the Instance ID that identifies the correct instance.

The Rendering Control Service (RCS) of the DMR 140 provides a set of DLNA actions that allow the DLNA interface 134 to control how the DMR 140 renders a piece of incoming content. This includes rendering characteristics such as Brightness, Contrast, Volume, Mute, etc. The Rendering Control service supports multiple, dynamic instances, which allows a renderer to "mix together" one or more content items (e.g. a Picture-in-Picture window on a TV or an audio mixer device). New instances of the service are created by the CM:PrepareForConnection( ) action. If the CM::PrepareForConnection( ) action is not implemented the default value 0 should be used for InstanceID. Therefore, one or more AVT InstanceIDs, and RCS InstanceIDs are returned to the DLNA interface 134.

At STEP 420, the operator uses the remote management device 101 to select the DMR 140 from the digital media device inventory to use. The remote management device 101 sends an OEM IPMI command to select a rendering device to the DLNA interface 134 with a selected DMR 140 with its AVT InstanceID. The IPMI message 109 is received at the network interface controller 126, and passed onto the network interface 129, to the IPMI message module 130, where the OEM IPMI command embedded in the IPMI message 109 is extracted from the IP packets and send to the DMC module 132.

At STEP 422, the DLNA interface 134 sends an SOAP control message containing command RCS:SelectDevice(dmr_uuid) to the specific DMR 140 selected by STEP 420 to inform the DMR 140 to play the digital media content to be selected in the next STEP 424.

At STEP 424, the operator uses the remote management device 101 to select a digital media content from the digital media content inventory to use. The remote management device 101 sends an OEM IPMI command to select a content with contentID to the DLNA interface 134 with a selected digital media content using its AVT InstanceID. The IPMI message 109 is received at the network interface controller 126, and passed onto the network interface 129, to the IPMI message module 130, where the OEM IPMI command embedded in the IPMI message 109 is extracted from the IP packets and send to the DMC module 132.

At STEP 426, the DLNA interface 134 sends an SOAP control message to select the specific content to the DMS 150 to identify the content to be displayed by the selected DMR 140.

At STEPs 428 and 430, the DLNA interface 134 sends two SOAP control messages containing DLNA action CDS:SetAVTransportUrl( ) to the DMS 150 and the DMR 140 to prepare for the content display(play) on the DMR 140 selected, and this command is invoked only once.

At STEPs 432 and 434, the DLNA interface 134 sends two SOAP control messages containing DLNA action AVT:play( ) to the DMS 150 and the DMR 140 to play the selected content display on the selected DMR 140, and this command is invoked only once.

At STEP 436, after the STEPs 432 and 434, the selected digital media content from the DMS 150 will be transported through an out-of-band content transfer channel to the selected DMR 140. The selected digital media content from the DMS 150 is displayed on the selected DMR 140 until the content display is completed.

At STEP 438, the operator can also send OEM IPMI messages containing RCS commands over the IPMI messaging channel to make adjustment on the DMR 140. For example, volume adjustment, balance adjustment, bass adjustment, treble adjustment, and audio mute, close caption setting can be used to make change to audio presentation. The commands for brightness adjustment, contrast adjustment, saturation adjustment, and hue adjustment can be used for visual presentation.

Other commands such as Play, Stop, Pause, Seek, Rewind, Fast Forward, can be implemented through the connection manager commands.

At STEP 440, the display of the selected digital media content is completed.

At STEP 442, the operator can select a digital media content from the digital media content inventory and select different DMR 140 to display (play) the selected digital media content by going back to STEP 420. This process can be repeated as many times as the operator wishes. Of course, the operator can skip the STEP 420 to keep the selected DMR 140, or skip the STEP 424 to keep the selected digital media content. If the STEPs 420 through 426 are skipped, then the selected digital media content will be displayed again and again until the operator stops the display.

At STEPs 444 and 446, once the digital media rendering is completed, the DLNA interface 134 sends two SOAP control messages containing command CM:ConnectionComplete( ) to both the DMS 150 and DMR 140 to close the connection between the DMS 150 and the DMR 140.

The Mobile IPMI APP 103 on the remote management device 101 uses the inventory and properties of the connected digital media devices and the digital media contents to formulate a user interface or graphical user interface (GUI) for an operator to monitor and manage these connected DMRs.

Figure 5:
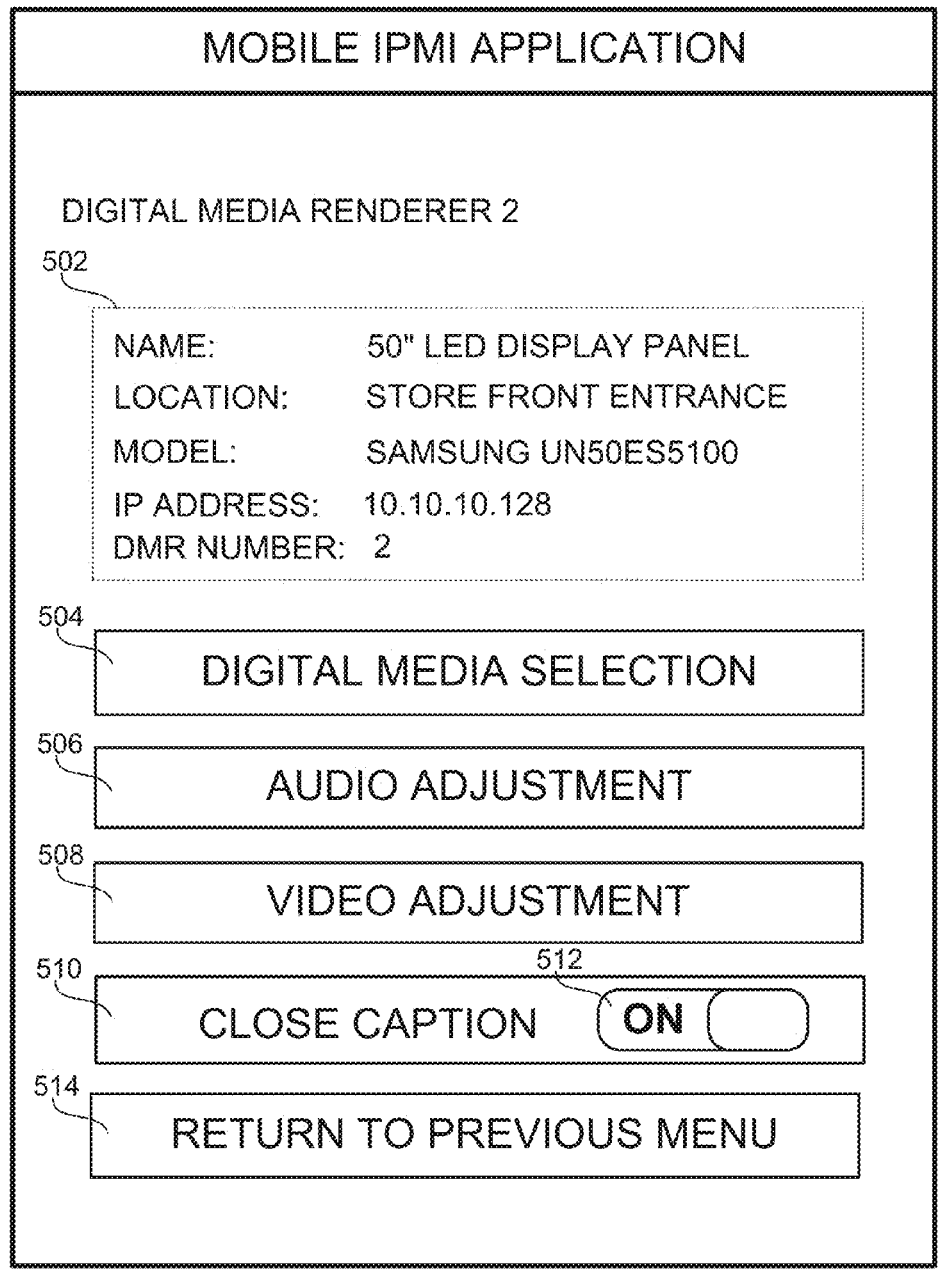
FIG. 5 shows an exemplary control user interface of an IPMI Application of the remote management system according to one embodiment of the present disclosure.

FIG. 5 shows an exemplary selected DMR user interface 500 of the Mobile IPMI APP 103 according to one embodiment of the present disclosure. In one embodiment, the user interface 500 include the name of the selected "Digital Media Renderer 2" and a property information display area 502, a Digital Media Selection option 504, an Audio Adjustment option 506, a Video Adjustment option 508, a Close Caption option 510 with the status and on/off switch button 512, and an option 616 to return to the previous menu.

In this example, the property information display area 502 displays: (a) the name of the "Display Device 2": 60" LED display Panel, (b) the location: Store Front Entrance, (c) the Model number: Samsung UN60ES6100, (d) the IP address: 10.10.10.128, and (e) the digital media device number: 2.

In one embodiment, when the operator tap one of the connected DMR, for example, the "Digital Media Renderer 2" shown in FIG. 5, the Mobile IPMI APP 103 on the remote management device 101 displays the detail information about the selected "Digital Media Renderer 2", and a user interface to make adjustment of the selected "Digital Media Renderer 2".

The "Digital Media Selection" option 504 allows the operator to select the digital media contents available for display at the selected "Digital Media Renderer 2".

The "Audio Adjustment" option 506 allows the operator to make audio adjustment to the selected "Digital Media Renderer 2". The Audio Adjustment option 506 may include: (a) a volume adjustment option, (b) a balance adjustment option, (c) bass and treble adjustment option, (d) a mute option, and more (not shown in any of the drawings). For example, if the operator needs to adjust the volume of the speaker/earphone, the set volume option is selected and the option causes a series of following actions:
 (a) looking at the device inventory to retrieve the UUID: dmr_2_uuid for the selected "Digital Media Renderer 2"; and
 (b) the DLNA interface 134 sending an SOAP control message containing a command RCS:setVolume (dmr_2_uuid) by the DLNA interface 134 to the DMR; and
 (c) the DLNA action RCS:setVolume(dmr_2_uuid) is executed by the DMR and the volume is set to a desired level.

The other control options: balance Adjustment, bass Adjustment, treble Adjustment, mute are also implemented in a similar manner.

The "Video Adjustment" option 508 allows the operator to make video adjustment to the selected "Digital Media Renderer 2". The options may include: (a) a Brightness Adjustment option, (b) a Contrast Adjustment option, (c) a Saturation Adjustment option, (d) a Hue Adjustment option, (e) a reset to factory or default setting option, and other applicable options (not shown in any of the drawings). For example, if the operator needs to adjust the brightness of the video display, the adjust brightness option is selected and the option causes a series of following actions:
 (a) looking at the device inventory to retrieve the UUID: dmr_2_uuid for the selected "Digital Media Renderer 2";
 (b) the DLNA interface 134 sending an SOAP control message containing a command RCS:setBrightness (dmr_2_uuid) to the DMR 140; and
 (c) the DLNA action RCS:setVolume(dmr_2_uuid) is executed by the DMR and the brightness is set to a desired level.

The other video control options: contrast adjustment, the saturation adjustment, and Hue adjustment are also implemented in a similar manner.

The "Close Caption" option 510 allows the operator to make turn on or off the close caption function of the DMR 140. The status and on/off button 512 indicates that the DMR is currently set the close caption on. If the operator moves the button 512 on the right to the left side, the operator turns off the close caption.

The option 514 allows the operator to navigate back to the previous menu.

Figure 6:
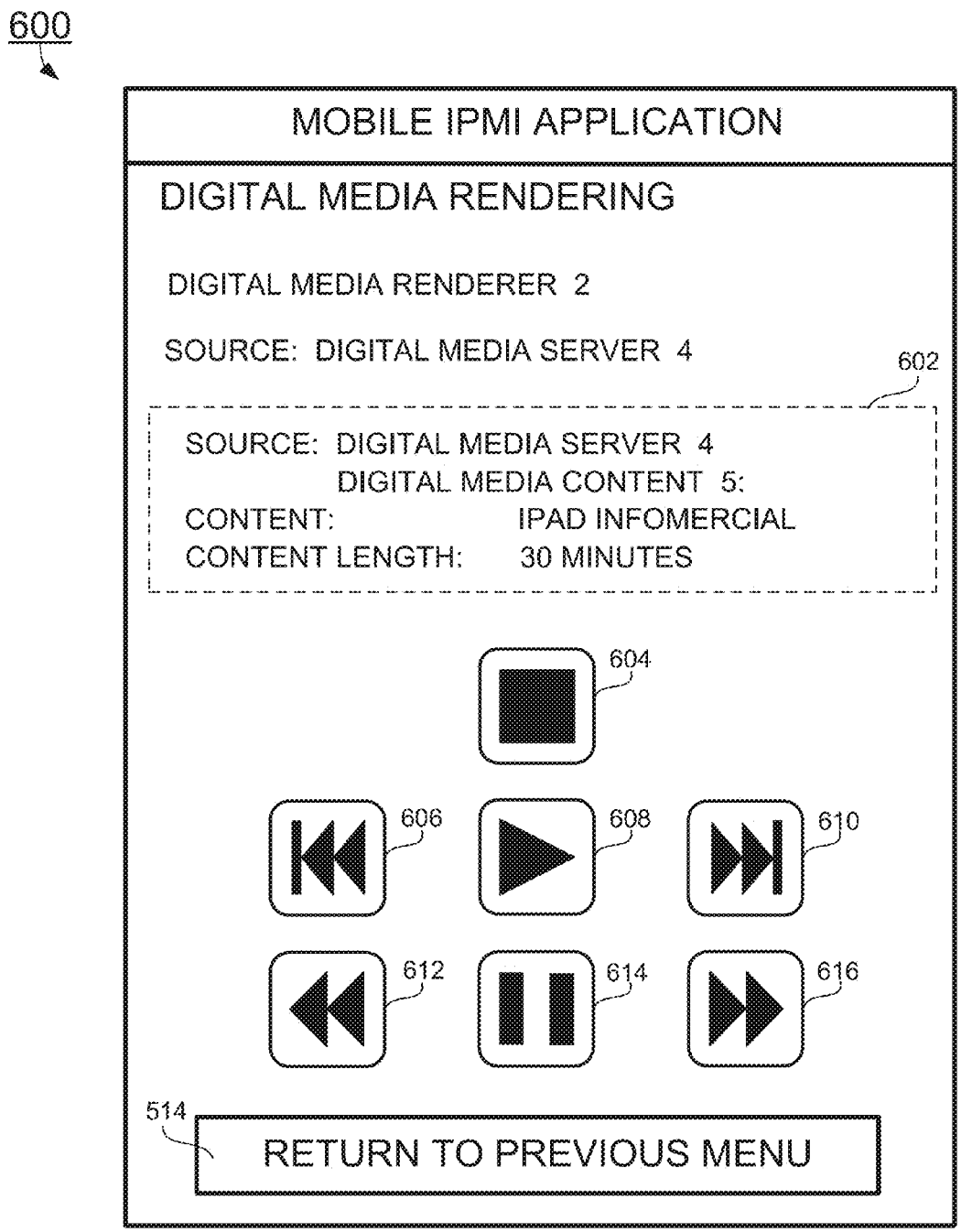
FIG. 6 shows an exemplary digital media rendering control user interface of the IPMI Application of the remote management system according to one embodiment of the present disclosure.

When the operator selects the Digital Media Selection option 504 to select a digital media content, a digital media content (for example, digital media content 5 on the digital media server 4) may be selected by the operator. The user interface displays an exemplary Digital Media Rendering user interface 600 as shown in FIG. 6 according to one embodiment of the present disclosure. The Digital Media Selection user interface 600 includes: (a) the name of the selected DMR, the source of the digital media: Digital Media Server 4, (b) a brief property display 602 of the selected digital media content: the source: Digital Media Server 4, the Digital Media Number 5, the content: an iPad informercial, and the content length: 30 minutes, (c) a group of play/display options, and (d) return to previous menu option 514 similar to the option shown in FIG. 5. The group of play/display options include:

(a) a Stop option 604—to Stop the Play/Display;
(b) a Rewind to Start option 606—to Rewind to the Start of the Play/Display;
(c) a Play option 608—to Play/Display;
(d) a Fast Forward to End option 610—to Fast Forward to the end of the Play/Display,
(e) a Rewind option 612—to Rewind the Play/Display;
(f) a Pause option 614—to Pause the Play/Display, and
(g) a Fast Forward option 616—to Fast Forward the Play/Display.

The Play option 508 allows the operator to play to the selected digital media content as listed on the user interface 600. The operator can tap the Play button 910 to start the Play/Display. This operation causes a series of following actions:

(a) the operator selection is sent by the user interface to the IPMI application program 103;
(b) the IPMI application program 103 looks for the selected DMR and DMR for their uuids;
(c) the IPMI application program 103 constructs an OEM IPMI command and embeds this command along with the uuids and contend ID to play the selected digital media content on the selected DMS to the selected DMR, and sends to the IPMI compatible DMC 122;
(d) the IPMI message module 130 receives the IPMI message containing the OEM IPMI command and forwards the OEM IPMI command to the DMC module 132;
(e) the DMC module 132 calls a function of the DLNA interface 134 to execute the OEM IPMI command;
(f) the DLNA interface 134 sends an SOAP control message to the connection manager of the DMS containing the command CMS::prepareForConnection( );
(g) the DMS executes the CMS::prepareForConnection( ) to get ready for connection;
(h) the DLNA interface 134 sends an SOAP control message to the connection manager of the DMR containing the command CMS::prepareForConnection( );
(i) the DMR executes the CMS::prepareForConnection( ) to get ready for connection;
(j) the DLNA interface 134 sends an SOAP control message to the AV Transport manager of the DMS containing the command AVT:Play( ), and the AV Transport service starts over an out-of-the-band transfer protocol and the designated digital media content on the DMS is played on the DMR.

In certain embodiments, the remote management devices such as the first remote management device 101 (a mobile device) and the second remote management device (a desktop computer) may include a web browser (not shown in FIG. 1), such as the INTERNET EXPLORER web browser from MICROSOFT CORPORATION of Redmond, Wash., or SAFARI web browser from APPLE INC of Palo Alto, Calif. that enables communication between the remote management devices and the IPMI compatible DMC 122.

The firmware of the IPMI Compatible DMC 122 accordingly operates a web server that provide browser-based user interfaces to the web browser of the remote management device. The browser-based user interfaces operates in a similar manner to the remote management program such as IPMI Application 103. The communication between the remote management device and the IPMI Compatible DMC follows IPMI protocol and the communication between the IPMI Compatible DMC and the digital media servers, digital media renderers follows DLNA protocols. Similar user interfaces can be implemented without departing the spirit and scope of the present disclosure.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. An IPMI Compatible Digital Media Controller (DMC), comprising:
    a processor;
    a network interface controller; and
    a memory containing a firmware configured
        to be, when executed at the processor, in communication with a plurality of digital media devices in a local DLNA network, wherein the plurality of digital media devices comprises at least one digital media renderer (DMR) and at least one digital media server (DMS);
        to receive an IPMI message from a remote management device through the network interface controller; and
        to execute, in response to the IPMI message, an DLNA operation of the DMR or DMS.

2. The IPMI Compatible DMC of claim 1, wherein the firmware further comprises:
    a DMC module to manage or perform management functions on one or more of the plurality of digital media devices according to a DLNA protocol;
    a network interface configured to receive and transmitting an IPMI message embedded in an IP packet to and from the remote management device;
    an IPMI message module configured to process the incoming IPMI message from, and outgoing IPMI message to the remote management device;
    a DLNA interface for receiving and transmitting the DLNA communication through the DLNA communication link;
    a digital media device database configured to store property information of the plurality of digital media devices;
    a digital media content database configured to store an inventory and the property information of digital media contents of the at least one DMS available to be rendered with the at least one DMR; and a SDR configured to store inventory information of the plurality of digital media devices.

3. The IPMI Compatible DMC of claim 2, wherein the firmware further comprises a DLNA interface in communication with the plurality of digital media devices in accordance with the DLNA communication protocol;
  wherein the DMC module is configured to
    determine the DLNA operation based on an IPMI command and a UUID of a target digital media device extracted from the IPMI message; and
    instruct the DLNA interface to invoke a corresponding DLNA action at the target digital media device.

4. The IPMI Compatible DMC of claim 1, wherein the remote management device comprises a user interface configured to
  present management operation options to a user; and
  receive management requests from the user, wherein each of the management requests includes data for constructing an IPMI message in accordance with the IPMI communication protocol, the IPMI message including at least an IPMI OEM command, a digital media device number of a selected digital media device, and a related command value.

5. The IPMI Compatible DMC of claim 1, wherein the firmware is configured to
  receive a DLNA response message encapsulated in at least one network packet from the plurality of digital media devices through the DLNA interface and a DLNA communication link between the IPMI Compatible DMC and the local DLNA network;
  generate an IPMI response message; and
  send the IPMI response message back to the remote management device.

6. The IPMI Compatible DMC of claim 1, wherein the firmware is configured to
  associate each of the at least one DMR with a respective universal unique identification (UUID) in accordance with the DLNA protocol;
  maintain a record of the association of the UUID and the DMR; and
  determine the target digital media device by examining the record with the UUID.

7. The IPMI Compatible DMC of claim 1, wherein the firmware is configured to
  associate each of the at least one DMS with a respective UUID in accordance with the DLNA protocol;
  maintain a record of the association of the UUID and the DMS; and
  maintain a record of the digital media contents in the DMS by the UUID.

8. The IPMI Compatible DMC of claim 1, wherein the firmware is configured to
  provide communication access for communicating with the plurality of digital media devices;
  interpret IPMI messages; and
  perform the DLNA operation directed to the plurality of digital media devices, wherein the DLNA operation is requested by an IPMI OEM command.

9. The IPMI Compatible DMC of claim 1, wherein the firmware is configured to dynamically discover inventory and property information of the plurality of digital media devices.

10. The IPMI Compatible DMC of claim 1, wherein the firmware further comprises an IPMI message interface in communication with the network interface controller in accordance with IPMI protocol.

11. An IPMI Compatible Digital Media Controller (DMC) implemented method for managing a DLNA system having a DLNA interface and a plurality of digital media devices, comprising:
  receiving a DLNA system management request at a user interface of a remote management device;
  constructing an IPMI message containing the DLNA management request to an IPMI Compatible DMC by an IPMI application program;
  extracting the DLNA management request embedded in the IPMI message at an IPMI message module;
  forwarding the DLNA management request to a DMC module;
  translating the DLNA management request into DLNA actions at the DMC module;
  sending the DLNA actions, by the DLNA interface, to the plurality of digital media devices; and
  executing the DLNA actions at the plurality of digital media devices.

12. The IPMI Compatible DMC implemented method of claim 11, wherein the plurality of digital media devices comprises at least one digital media renderer (DMR) and at least one digital media server (DMS).

13. The IPMI Compatible DMC implemented method of claim 11, wherein the IPMI Compatible DMC comprises:
  a processor;
  a network interface controller; and
  a memory containing a firmware, when executed at the processor, configured to,
    be in communication with the plurality of digital media devices in a local DLNA network;
    receive an IPMI message from a remote management device through a network interface controller; and
    execute, in response to the IPMI message, an DLNA operation by the plurality of digital media devices.

14. The IPMI Compatible DMC implemented method of claim 11, further comprising:
  receiving response information from the plurality of digital media devices at the DLNA interface;
  sending the response information to the DMC module and the IPMI message module of the IPMI Compatible DMC;
  constructing an IPMI response message at the IPMI message module;
  sending the IPMI response message to the IPMI application program; and
  displaying the response information in the IPMI response message at the user interface of the remote management device.

15. The IPMI Compatible DMC implemented method of claim 11, further comprising:
  providing communication access for communication between the user interface to the IPMI message module according to the IPMI protocol; and
  providing communication access for communication between the DMC module and the plurality of digital media devices according to the DLNA protocol.

16. The IPMI Compatible DMC implemented method of claim 11, further comprising:
  dynamically discovering the plurality of digital media devices;
  storing the device information of the discovered digital media devices in a digital media device database and a sensor data record (SDR) on the IPMI Compatible DMC;
  receiving browsing digital media content request from the user interface;

retrieving digital media content information on the at least digital media server by the DLNA interface; and storing the digital media content information retrieved in a digital media content database on the IPMI Compatible DMC.

17. A non-transitory computer storage medium having computer-executable instructions stored thereon which, when executed by a processor of an IPMI Compatible Digital Media Controller (DMC), cause the processor to receive a DLNA system management request at a user interface of a remote management device;

construct an IPMI message containing the DLNA management request to an IPMI Compatible DMC by an IPMI application program;

extract the DLNA management request embedded in the IPMI message at an IPMI message module;

forward the DLNA management request to a DMC module;

translate the DLNA management request into DLNA actions at the DMC module;

send the DLNA actions, by the DLNA interface, to the plurality of digital media devices; and execute the DLNA actions at the plurality of digital media devices.

18. The non-transitory computer storage medium of claim 17, wherein the computer-executable instructions cause the processor to receive response information from the plurality of digital media devices at the DLNA interface;

send the response information to the DMC module and the IPMI message module of the IPMI Compatible DMC;

construct an IPMI response message at the IPMI message module;

send the IPMI response message to the IPMI application program; and display the response information in the IPMI response message at the user interface of the remote management device.

19. The non-transitory computer storage medium of claim 17, wherein the computer-executable instructions cause the processor to provide communication access for communication between the user interface to the IPMI message module according to the IPMI protocol; and provide communication access for communication between the DMC module and the plurality of digital media devices according to the DLNA protocol.

20. The non-transitory computer storage medium of claim 17, wherein the computer-executable instructions cause the processor to dynamically discover the plurality of digital media devices;

store the device information of the discovered digital media devices in a digital media device database and a sensor data record (SDR) on the IPMI Compatible DMC;

receive browsing digital media content request from the user interface;

retrieve digital media content information on the at least digital media server by the DLNA interface; and store the digital media content information retrieved in a digital media content database on the IPMI Compatible DMC.

* * * * *